(12) United States Patent
Nishizawa et al.

(10) Patent No.: US 11,142,891 B2
(45) Date of Patent: Oct. 12, 2021

(54) WORKING MACHINE

(71) Applicant: HITACHI CONSTRUCTION MACHINERY CO., LTD., Tokyo (JP)

(72) Inventors: Tadashi Nishizawa, Tokyo (JP); Hiroshi Sakamoto, Ibaraki (JP); Takuya Naka, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 133 days.

(21) Appl. No.: 16/606,835

(22) PCT Filed: Aug. 24, 2018

(86) PCT No.: PCT/JP2018/031377
§ 371 (c)(1),
(2) Date: Oct. 21, 2019

(87) PCT Pub. No.: WO2019/039593
PCT Pub. Date: Feb. 28, 2019

(65) Prior Publication Data
US 2020/0048871 A1 Feb. 13, 2020

(30) Foreign Application Priority Data
Aug. 24, 2017 (JP) .............................. JP2017-161600

(51) Int. Cl.
*E02F 9/26* (2006.01)
*B60Q 5/00* (2006.01)
(Continued)

(52) U.S. Cl.
CPC .............. *E02F 9/262* (2013.01); *B60Q 5/006* (2013.01); *B60Q 9/008* (2013.01); *E02F 3/32* (2013.01);
(Continued)

(58) Field of Classification Search
CPC ... E02F 3/32; E02F 3/435; E02F 9/123; E02F 9/2033; E02F 9/2203; E02F 9/2253;
(Continued)

(56) References Cited

U.S. PATENT DOCUMENTS

2013/0088593 A1* 4/2013 Ishimoto .................. H04N 7/18
348/143
2013/0222573 A1* 8/2013 Onuma ..................... H04N 7/18
348/82
(Continued)

FOREIGN PATENT DOCUMENTS

JP 5-64254 U 8/1993
JP 11-222882 A 8/1999
(Continued)

OTHER PUBLICATIONS

International Search Report of PCT/JP2018/031377 dated Nov. 13, 2018.
(Continued)

*Primary Examiner* — Tyler J Lee
(74) *Attorney, Agent, or Firm* — Mattingly & Malur, PC

(57) ABSTRACT

Work efficiency is improved while necessary and sufficient monitoring on the surroundings of a working machine is performed. A working machine includes an undercarriage 132 on which an upperstructure 131 including a front working device is mounted in a swingable manner, and includes a surrounding monitoring device 200 that monitors surroundings. The surrounding monitoring device 200 has an information controller 161 that: sets a working region by use of terrain data and work states received from sensors detecting work states of the front working device of the working machine; calculates proximity for each of the obstacles around the working machine by use of the working regions and relative positions of each of obstacles and the working machine, the obstacles being detected by an
(Continued)

obstacle sensor that detects obstacles around the working machine; and outputs a control instruction in accordance with the proximity.

12 Claims, 20 Drawing Sheets

(51) Int. Cl.
  *B60Q 9/00* (2006.01)
  *E02F 3/32* (2006.01)
  *E02F 3/43* (2006.01)
  *E02F 9/12* (2006.01)
  *E02F 9/24* (2006.01)

(52) U.S. Cl.
  CPC .............. *E02F 3/435* (2013.01); *E02F 9/123* (2013.01); *E02F 9/24* (2013.01); *E02F 9/26* (2013.01); *E02F 9/265* (2013.01)

(58) Field of Classification Search
  CPC ..... E02F 9/24; E02F 9/26; E02F 9/262; E02F 9/265; E02F 9/268; B60Q 5/006; B60Q 9/008
  See application file for complete search history.

(56) References Cited

U.S. PATENT DOCUMENTS

| 2014/0354813 | A1* | 12/2014 | Ishimoto | B60R 1/00 |
| | | | | 348/148 |
| 2015/0142276 | A1 | 5/2015 | Wu et al. | |
| 2016/0002882 | A1 | 1/2016 | Kanari et al. | |
| 2016/0006947 | A1* | 1/2016 | Kowatari | H04N 5/44 |
| | | | | 348/148 |
| 2016/0224026 | A1* | 8/2016 | Hamada | E02F 9/2054 |
| 2017/0016210 | A1* | 1/2017 | Kowatari | G06T 3/4038 |
| 2017/0030054 | A1* | 2/2017 | Okumura | H04N 7/18 |
| 2017/0089042 | A1* | 3/2017 | Machida | H04N 5/272 |
| 2019/0078294 | A1* | 3/2019 | Nagato | E02F 9/20 |

FOREIGN PATENT DOCUMENTS

| JP | 2005-29338 A | 2/2005 |
| JP | 2006-307436 A | 11/2006 |
| JP | 2007-023486 A | 2/2007 |
| JP | 2014-6577 A | 1/2014 |
| KR | 10-2014-0002784 A | 1/2014 |

OTHER PUBLICATIONS

Extended European Search Report received in corresponding European Application No. 18849172.4 dated Mar. 3, 2021.

Korean Office Action received in corresponding Korean Application No. 10-2019-7026611 dated Nov. 12, 2020.

* cited by examiner

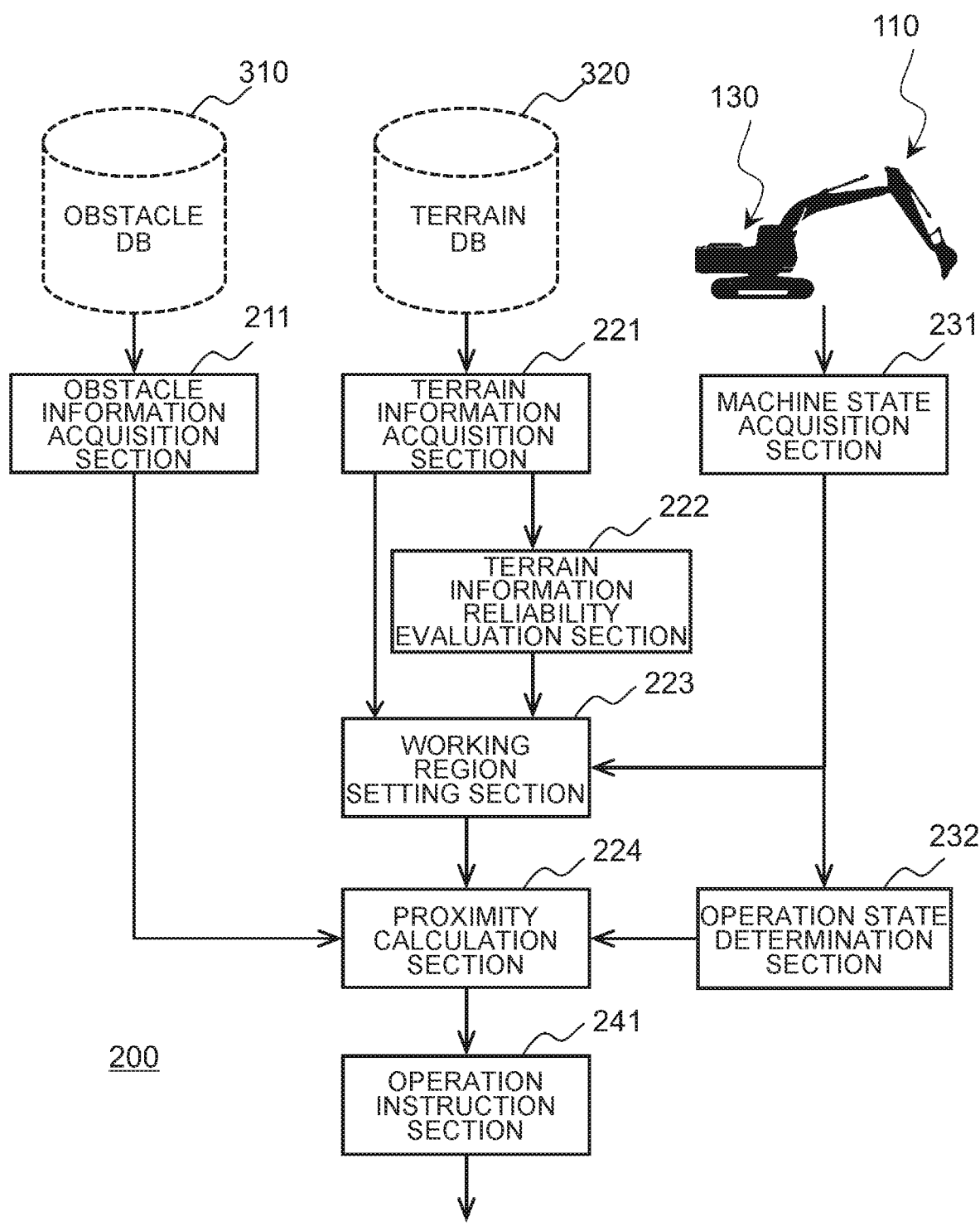

WORKING MACHINE

TECHNICAL FIELD

The present invention relates to a surrounding monitoring technology for a working machine.

BACKGROUND ART

Monitoring the surroundings is an absolute necessity for working machinery. As an example of the surrounding monitoring technology, for example, Patent Literature 1 discloses a technique to monitor the surroundings of a hydraulic excavator for control to prevent interference of a distal end of a bucket of the hydraulic excavator with obstacles. In the technique disclosed in Patent Literature 1, "coordinates of a bucket end position are computed from a current position of a machine body, a bearing of the upperstructure, and detected values of turning angles of a boom, an arm and a bucket, and if the computed coordinates fall within a preset interference avoidance range, control is performed to reduce the speed of moving the bucket end in the vertical direction and the horizontal direction, and stop the bucket at a preset distance from an obstacle (excerpts from abstract)."

CITATION LIST

Patent Literature

PATENT LITERATURE 1: JP-A No. 2006-307436

SUMMARY OF INVENTION

Technical Problem

The technique disclosed in Patent Literature 1 gives no consideration to the relationship among the working machine, obstacles, and surrounding terrain. Because of this, even when the probability of contact with an obstacle is actually low, if the distance between the working machine and the obstacle is short, an alarm may be output or avoidance control may be performed.

The present invention has been achieved in view of the above-mentioned circumstances, and it is an object thereof to provide a technique to improve work efficiency while performing necessary and sufficient monitoring on the surroundings of a working machine.

Solution to Problem

The present invention provides a working machine in which an upperstructure including a front working device is mounted to be capable of swinging relative to an undercarriage and which includes a surrounding monitoring device that monitors surroundings. In the working machine, the surrounding monitoring device has an information controller that: sets a working region by use of terrain data and work states received from sensors detecting work states of the front working device of the working machine; calculates proximity for each of the obstacles around the working machine by use of the working regions set and relative positions of each of obstacles and the working machine, the obstacles being detected by an obstacle sensor that detects obstacles around the working machine; and outputs a control instruction in accordance with the proximity.

Advantageous Effects of Invention

According to the present invention, an improvement in work efficiency is enabled while necessary and sufficient monitoring is performed on the surroundings of a working machine. The above and other aspects, features and advantages of the invention will be more apparent from the following description of embodiments.

BRIEF DESCRIPTION OF DRAWINGS

FIG. 7 is a functional block diagram of a surrounding monitoring device according to an embodiment of the present invention.

DESCRIPTION OF EMBODIMENT

An embodiment according to the present invention will now be described with reference to the accompanying drawings. It is noted that, throughout all the drawings for the description of the embodiment, like reference signs are used to refer to elements having the same/similar functions unless otherwise specified, and a repetitive description thereof is omitted.

In the embodiment, with consideration given to information on terrain features around a working machine, proximity distances of the working machine to each obstacle around the working machine are classified into levels, and warning generation and control are performed in accordance with the levels.

The following embodiment is described using a hydraulic excavator as an example of the working machine. It is noted that the working machine is not limited to a hydraulic excavator. The working machine may be, for example, a bulldozer or a loader.

Configuration

Figure 1:
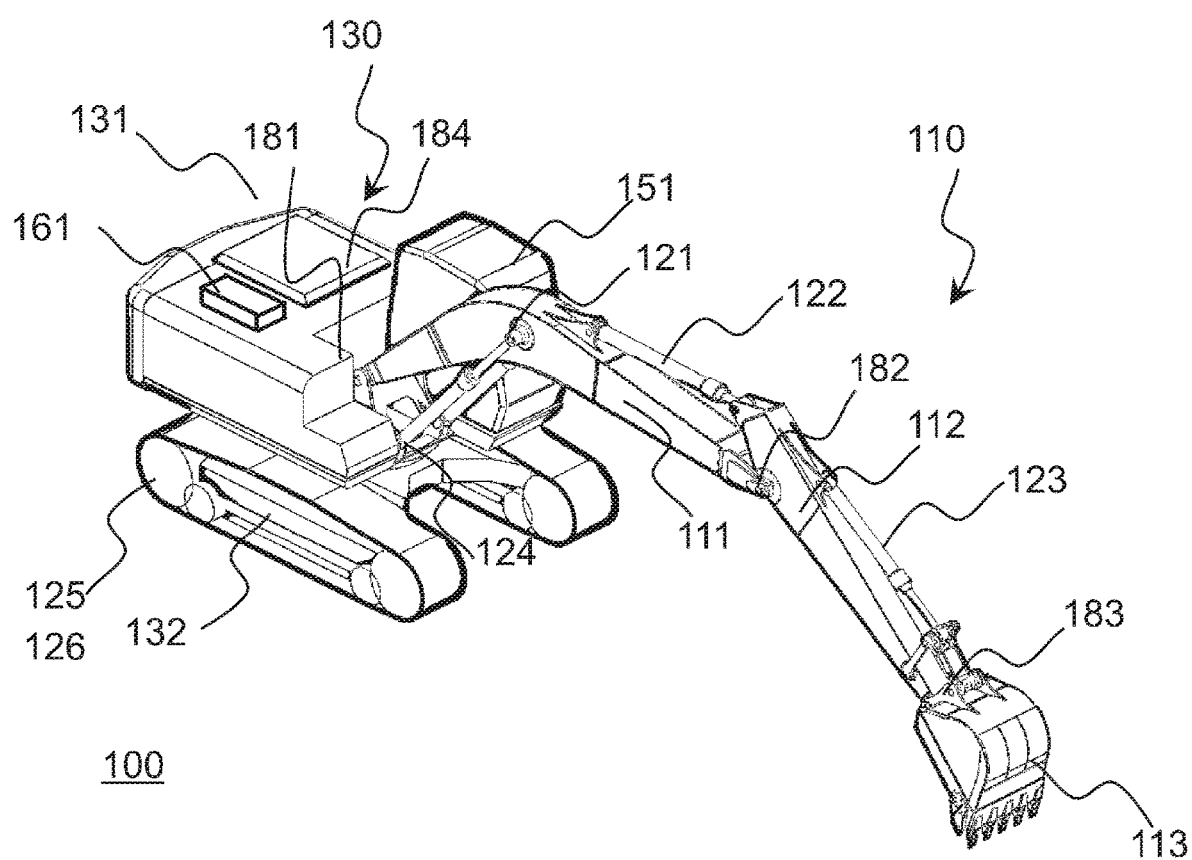
FIG. 1 is an explanatory diagram for illustrating an overview of a hydraulic excavator as an example of a working machine according to an embodiment of the present invention.

First, a schematic configuration of a hydraulic excavator 100 according to the embodiment is described. FIG. 1 is a diagram showing an overview of the hydraulic excavator 100 according to the embodiment.

The hydraulic excavator 100 includes a multijoint front working device 110 and a vehicle body 130. The multijoint front working device 110 includes a boom 111, an arm 112 and a bucket 113. The boom 111, the arm 112 and the bucket 113 are driven for excavation and haulage of earth by actuators of a boom cylinder 121, an arm cylinder 122 and a bucket cylinder 123, respectively.

The vehicle body 130 includes an upperstructure 131 and an undercarriage 132. The upperstructure 131 and the undercarriage 132 are allowed to swing by driving of a swing motor 124 and to travel in a front and rear directions and rotationally by driving of left and right traveling motors 125, 126.

The upperstructure 131 also includes a cab 151. In the cab 151, a control lever 152, an output apparatus (e.g., a monitor 153, a buzzer 154 (see FIG. 2) and the like) are installed.

Further, the boom 111, arm 112, bucket 113 and the upperstructure 131 include respectively angle detectors 181, 182, 183 and 184 to detect their rotating angles.

The hydraulic excavator 100 also includes an external recognition sensor 156 (see FIG. 2) to acquire obstacle information. The external recognition sensor 156 is, for example, a camera, radar, a laser scanner and/or the like.

Control System

Figure 2:
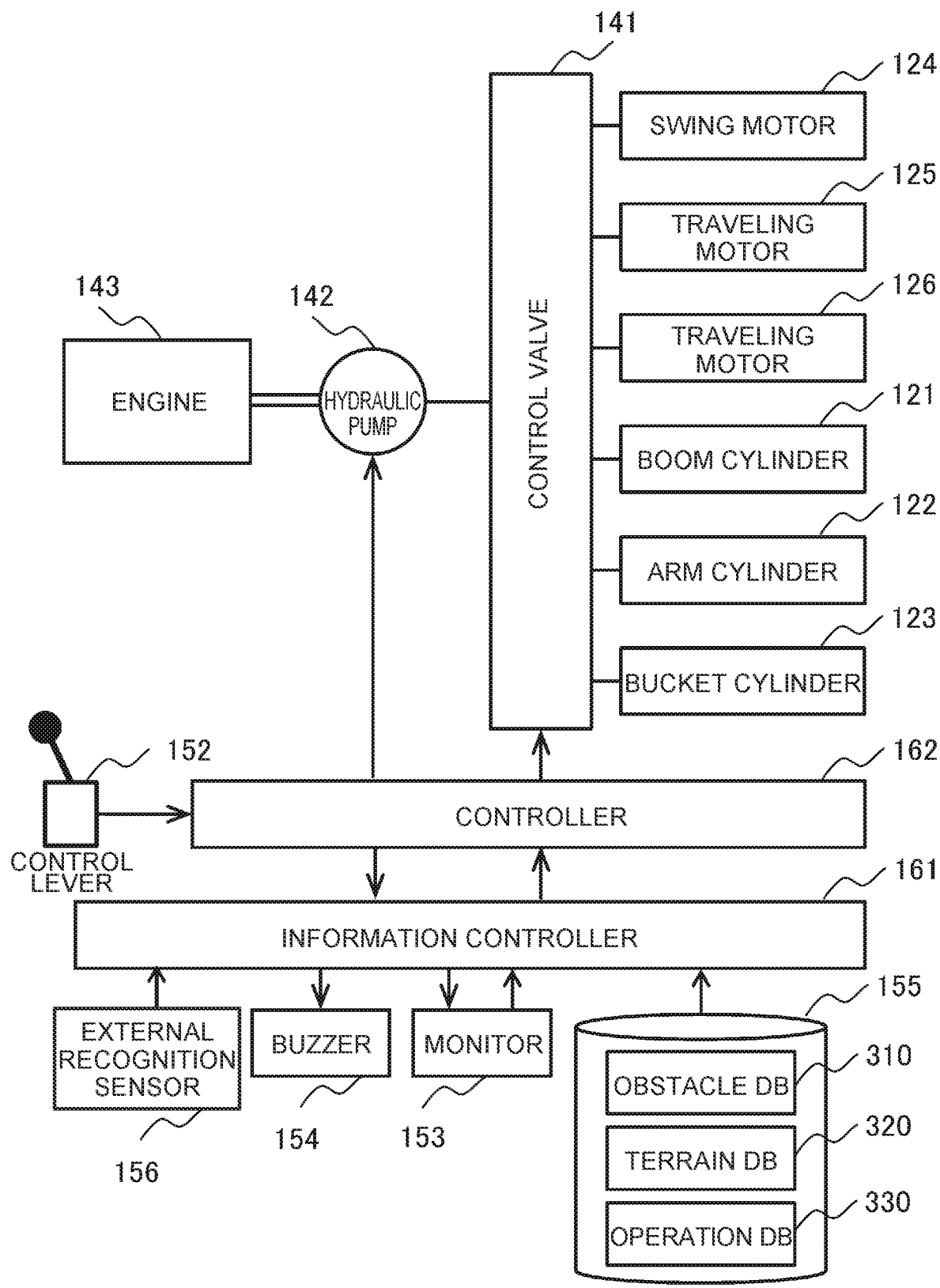
FIG. 2 is an explanatory diagram for illustrating an overview of a control system of the hydraulic excavator according to an embodiment of the present invention.

The following is a description of an overview of a control system of the hydraulic excavator 100 according to the embodiment. FIG. 2 is a diagram illustrating an example control system of the hydraulic excavator 100.

The hydraulic excavator 100 further includes an engine 143, a hydraulic pump 142, a control valve 141, a controller 162 and an information controller 161.

The hydraulic pump 142 is actuated by power of the engine 143. Upon an operator operating the control lever 152, the operation information is converted to a control signal at the controller 162. The control signal is sent to the hydraulic pump 142 and the control valve 141 to control the output of the hydraulic pump 142 and an electromagnetic valve of the control valve 141. Thereby, the swing motor 124, traveling motors 125, 126, boom cylinder 121, arm cylinder 122 and the bucket cylinder 123 are driven.

The information controller 161 is connected to the controller 162, the buzzer 154, the monitor 153 and a storage medium 155. The information controller 161: presents information to the operator through the buzzer 154 and the monitor 153; outputs a control instruction on the control valve 141, to the controller 162; and performs arithmetic processing using information on obstacles and terrain features.

The information controller 161 may also include a communication function of transmitting/receiving data to/from the outside of the hydraulic excavator 100.

In the embodiment, the storage medium 155 has an obstacle database (DB) 310, a terrain DB 320 and an operation DB 330 stored therein.

The obstacle DB 310 holds information on obstacles located around the hydraulic excavator 100. The obstacle information to be held is obtained, for example, from the external recognition sensor 156 and/or the like. It should be noted that the obstacle information may be acquired, for example, by a sensor installed outside the hydraulic excavator 100 and then transmitted to the information controller 161 through radio communication. Further, the obstacle information may be a combination of the information obtained from the external recognition sensor 156 and the transmitted information. The obstacle information held in the obstacle DB 310 is updated at predetermined time intervals by being transmitted from the external recognition sensor 156 and/or the like.

Hereinafter, in the specification, the obstacles refer to a objects or structure which is not subject to work of the hydraulic excavator 100.

The terrain DB 320 holds map information (terrain information) on the surroundings of the hydraulic excavator 100. Similarly to the obstacle information, the terrain information to be held is obtained, for example, from the external recognition sensor 156. The terrain information may also be acquired, for example, by a sensor installed outside the hydraulic excavator 100 and then transmitted to the information controller 161 through radio communication. Similarly to the obstacle information, the terrain information may be a combination of them. Alternatively, data stored in a server located outside the hydraulic excavator 100, or the like may be set.

The terrain information held in the terrain DB 320 is updated at predetermined time intervals.

The operation DB 330 holds control operation for each level set for each obstacle, as described later.

In the embodiment, the information controller 161 uses various pieces of data stored in the storage medium 155 to implement a surrounding monitoring device 200 which will be described later.

Prior to the description of the surrounding monitoring device 200 according to the embodiment, the overview of the embodiment is described.

Figure 3:
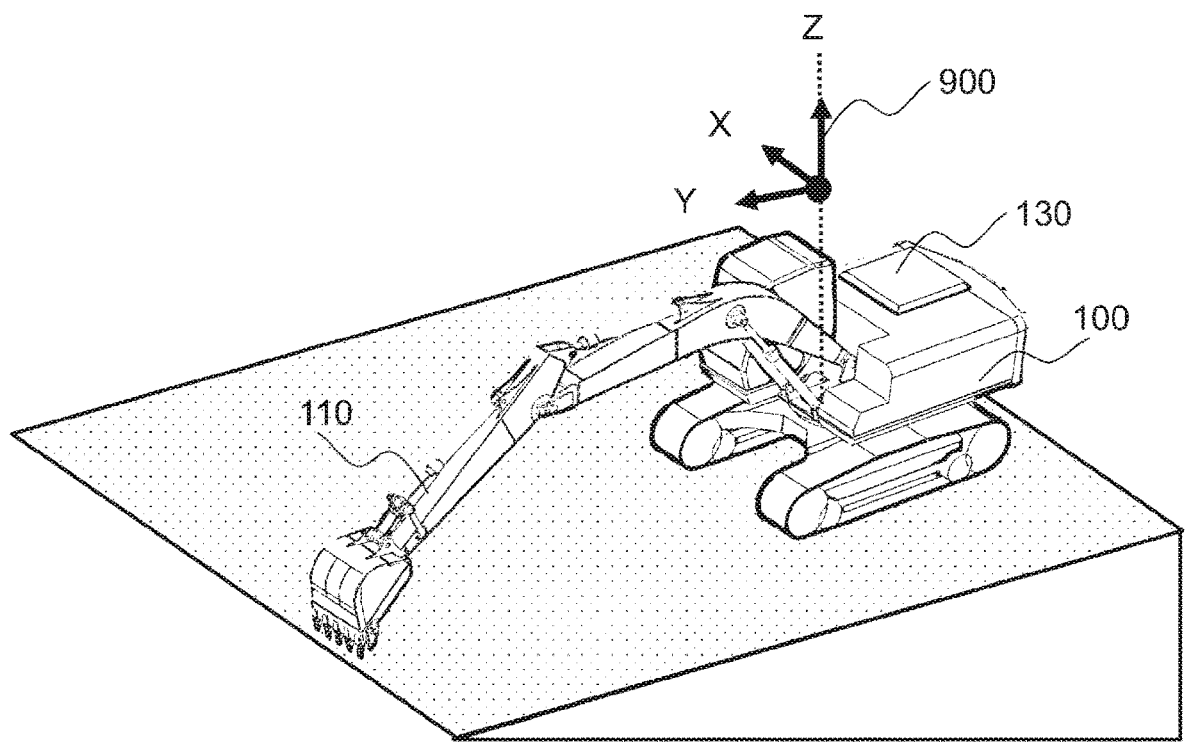
FIG. 3 is an explanatory diagram for illustrating a vehicle-body coordinate system used in the specification.

First, a coordinate system used herein is described. In the embodiment, a vehicle-body coordinate system 900 fixed to the vehicle body 130 shown in FIG. 3 is used. The vehicle-body coordinate system 900 is a rectangular coordinate system having an origin at the center of gravity of the hydraulic excavator 100, an X axis and a Y axis in a horizontal plane, and a Z axis in the vertical direction. In the embodiment, assuming that the left-right direction of the vehicle body 130 is the X axis, and the direction orthogonal to the X axis in the horizontal plane is the Y axis.

FIG. 4A to FIG. 6B are explanatory diagrams of some examples of the operation scenes of the hydraulic excavator 100. Typically, if an obstacle exists within the operating radius of the hydraulic excavator 100, the probability of contact is high. However, where a mount 711 with a predetermined height exists between the hydraulic excavator 100 and an obstacle, the probability of contact varies depending upon the height and material of the mount. Here, described is an example where the bucket 113 is located in a position farthest from the vehicle body 130 of the hydraulic excavator 100. In the figures, the height of the distal end of the bucket 113 is expressed as 710.

Figure 4A:
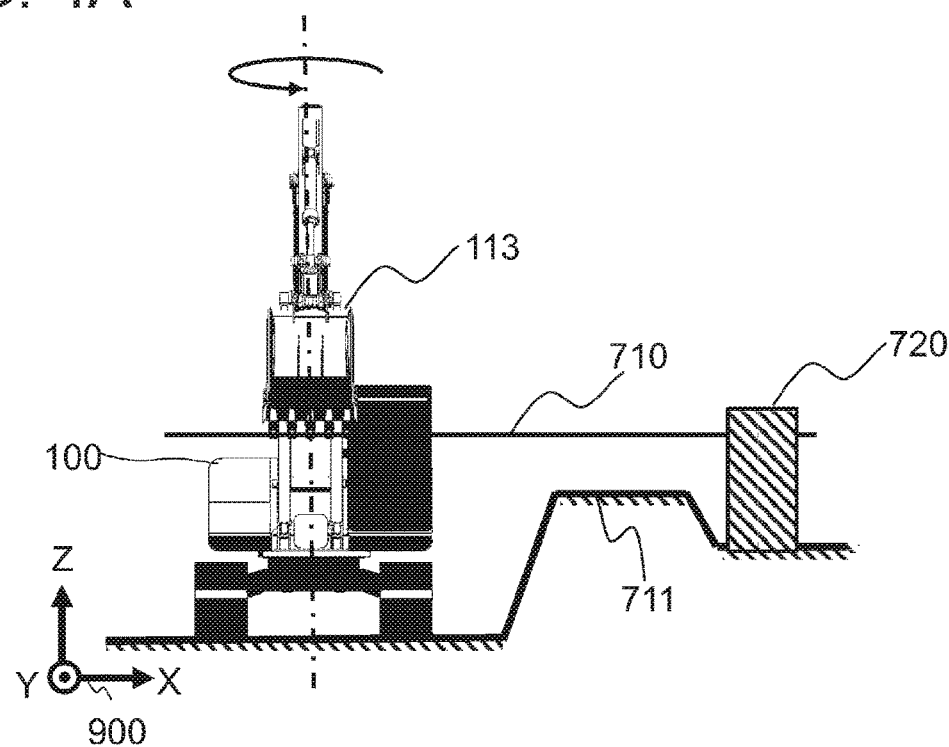
FIGS. 4A and 4B are explanatory diagrams for illustrating an example of an operation scene of the hydraulic excavator.
Figure 4B:
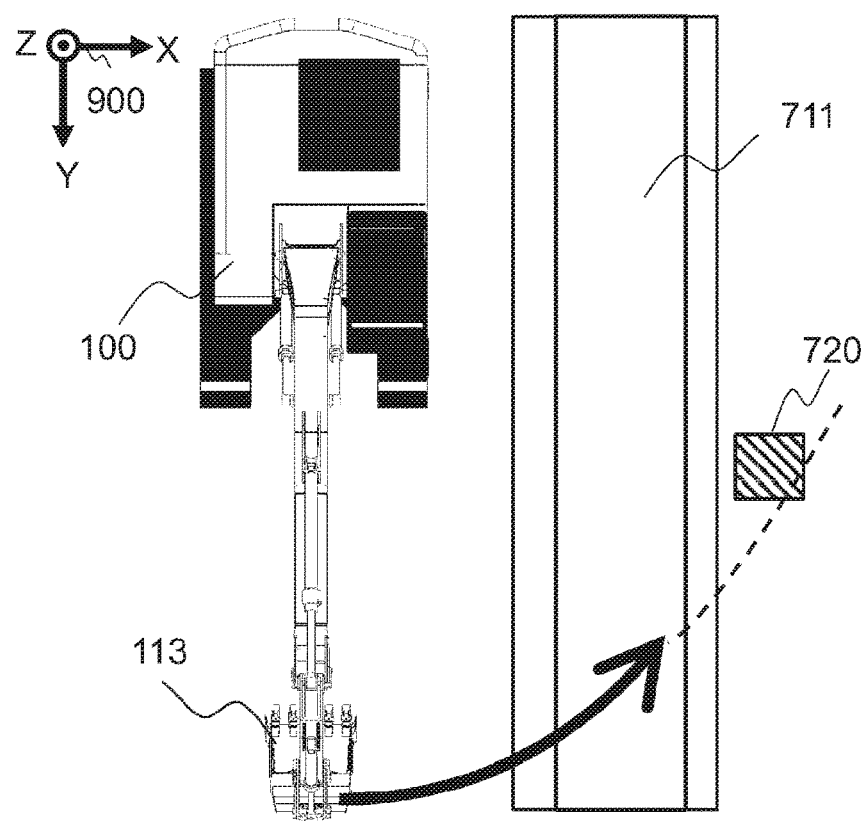
Figure 5A:
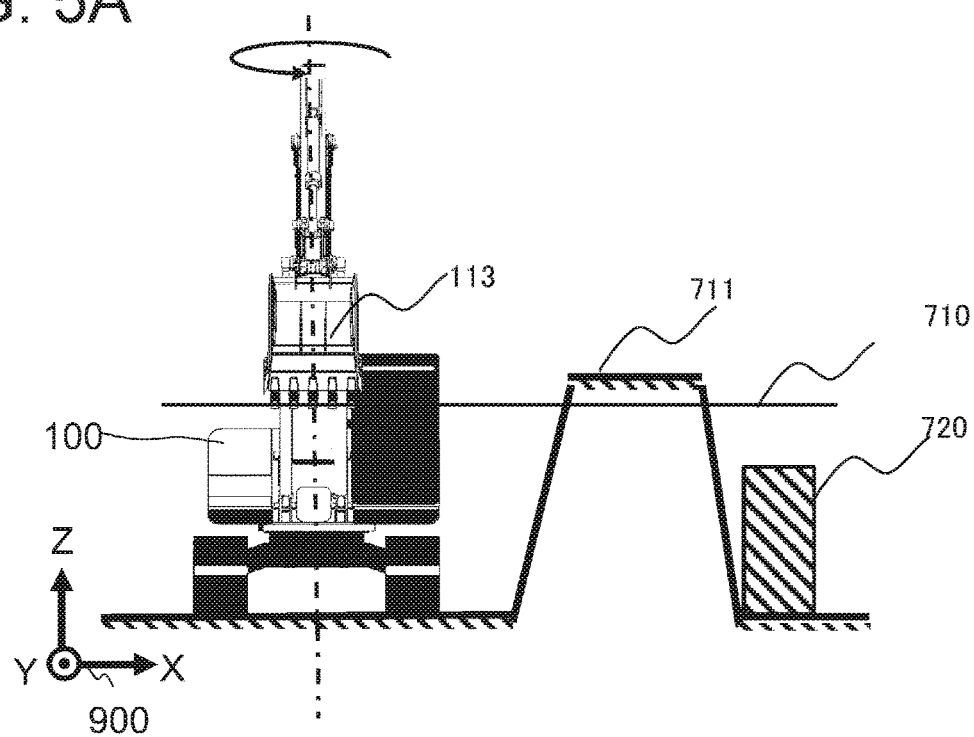
FIGS. 5A and 5B are explanatory diagrams for illustrating another example of an operation scene of the hydraulic excavator.
Figure 5B:
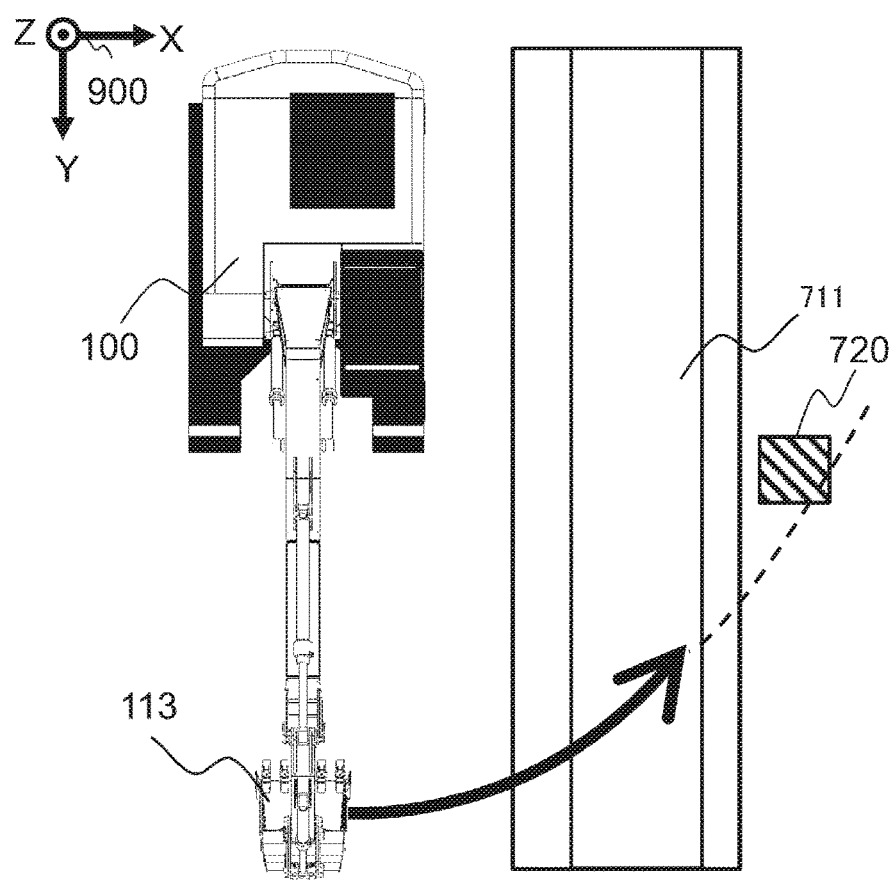
Figure 6A:
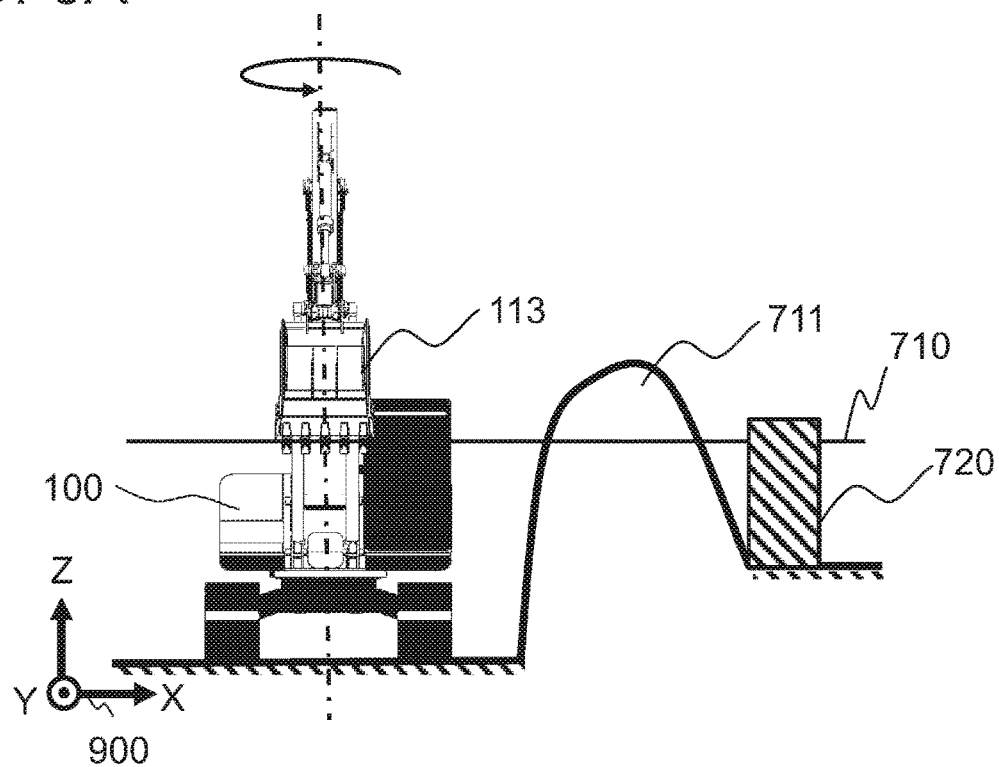
FIGS. 6A and 6B are explanatory diagrams for illustrating still another example of an operation scene of the hydraulic excavator.
Figure 6B:
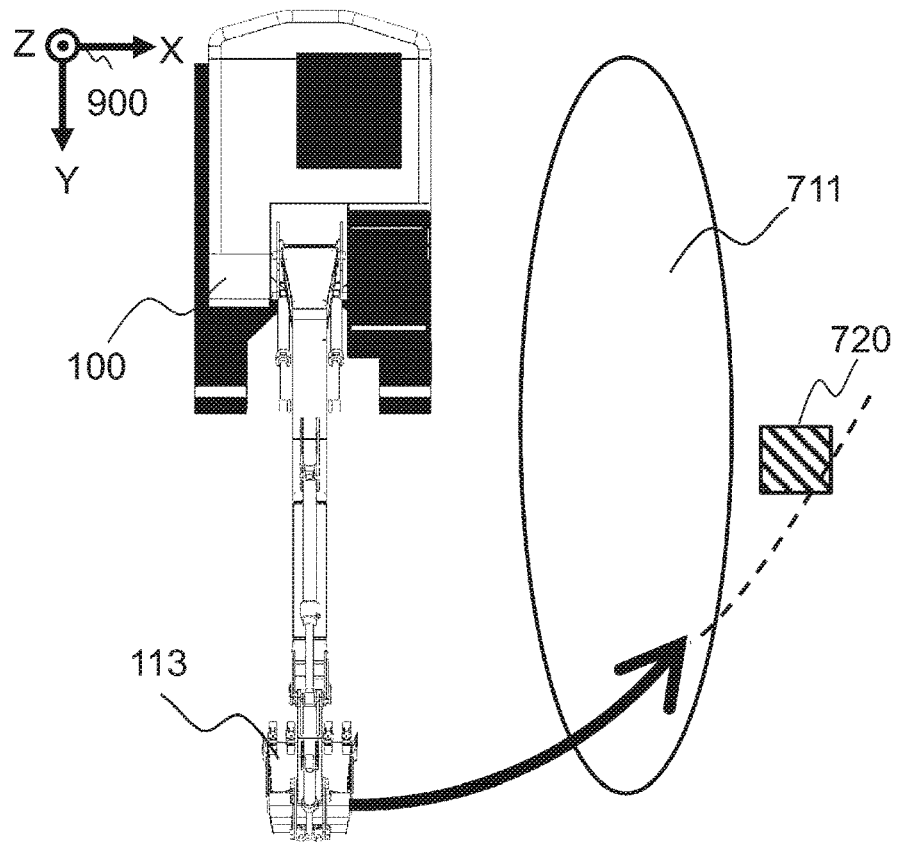

Incidentally, FIG. 4A, FIG. 5A and FIG. 6A are diagrams when the hydraulic excavator 100 is seen from the front, and FIG. 4B, FIG. 5B and FIG. 6B are diagrams when the hydraulic excavator 100 is seen from directly above.

FIGS. 4A and 4B illustrate the operation scene when the mount 711 lower than the height 710 of the distal end of the bucket 113 is located between the hydraulic excavator 100 and the obstacle 720.

In such an event, even if the mount 711 exists between the obstacle 720 and the hydraulic excavator 100, because the height of the mount 711 is lower than the height 710 of the distal end of the bucket 113, there is high probability that during rotation, the bucket 113 may come into contact with the obstacle 720. Because of this, in the surrounding monitoring device 200 according to the embodiment, the obstacle 720 located in such a position is classified to high probability of contact, and specified as an obstacle for which a warning is required.

FIGS. 5A and 5B illustrate the operation scene when the mount 711, which is higher than the height 710 of the distal end of the bucket 113 and also is on stable ground, exists between the hydraulic excavator 100 and the obstacle 720. In such an event, there is a low probability that the bucket 113 may come into contact with the obstacle 720. In the surrounding monitoring device 200 according to the embodiment, the obstacle 720 located in such a position is classified to zero probability of contact and is not specified as an obstacle for which a warning is required.

FIGS. 6A and 6B illustrate the operation scene when the mount 711, which is higher than the height of the distal end of the bucket 113 and also is on unstable ground, exists between the hydraulic excavator 100 and the obstacle 720. In such an event, there is probability that the mount 711 may collapse and therefore the bucket 113 may come into contact with the obstacle 720. Accordingly, the surrounding monitoring device 200 according to the embodiment classifies the obstacle 720 to non-zero probability of contact and is specified as an obstacle for which a warning is required.

Surrounding Monitoring Device

The following description is of the surrounding monitoring device 200 according to the embodiment to implement warning control as described above. FIG. 7 is a functional block diagram of the surrounding monitoring device 200 according to the embodiment.

The surrounding monitoring device 200 includes an obstacle information acquisition section 211, a terrain information acquisition section 221, a machine state acquisition section 231, a terrain information reliability evaluation section 222, a working region setting section 223, an operation state determination section 232, a proximity calculation section 224, and an operation instruction section 241.

The obstacle information acquisition section 211 acquires positional information in the vehicle-body coordinate system 900, regarding each obstacle detected by the external recognition sensor 156 which is an obstacle sensor that detects obstacles around the hydraulic excavator 100.

The obstacle information acquisition section 211 also converts the terrain data to the vehicle-body coordinate system 900 to obtain terrain data in the vehicle-body coordinate system 900. Also, the terrain information reliability evaluation section 222 acquires reliability information for each position from the terrain information.

From data acquired by the sensor installed in each component of the hydraulic excavator 100, the machine state acquisition section 231 acquires positional information on each component of the multijoint front working device 110 including bucket 113, and the like. And, the operation state determination section 232 obtains a swing angular speed of the multijoint front working device 110.

And, the working region setting section 223 sets a working region from the terrain data, a degree of reliability, the positional information on each component of the multijoint front working device 110, and the like. And, the proximity calculation section 224 calculates a level of proximity of each obstacle by use of the set working region and the obstacle information.

The operation instruction section 241 makes a decision about warning operation in accordance with the level of proximity of each obstacle, and outputs a control instruction in accordance with the warning operation to each component of the hydraulic excavator 100.

It is noted that each component as described above is implemented by the information controller 161 loading and executing a predefined program into memory. The program is stored, for example, on the storage medium 155 and/or the like. It is noted that the information controller 161 includes hardware such as ASIC (Application Specific Integrated Circuit), FPGA (Field-Programmable Gate Array) and the like, by which all or a part of the function may be implemented. Also, various pieces of data used in processing for each component, and various pieces of data generated during processing are stored in the memory or the storage medium 155.

The following details are about processing for each component.

Obstacle Information Acquisition Section

The obstacle information acquisition section 211 obtains information on obstacles around the hydraulic excavator 100 from the obstacle DB 310, and converts the information into values in the vehicle-body coordinate system 900. The obstacle information acquisition section 211 obtains obstacle information from the obstacle DB 310 at predetermined time intervals. It is noted that acquisition timing may be synchronized with an update of information in the obstacle DB 310, or may be predefined timing. At this time, first, the presence/absence of obstacles around the hydraulic excavator 100 is determined using the obtained obstacle information. Then, if the presence of obstacles is determined, the obstacle information acquisition section 211 converts the positional information on each obstacle obtained from the obstacle information to the vehicle-body coordinate system 900 to calculate converted obstacle information. The conversion equation is pre-held.

Obstacle Information Acquisition Processing

Figure 8:
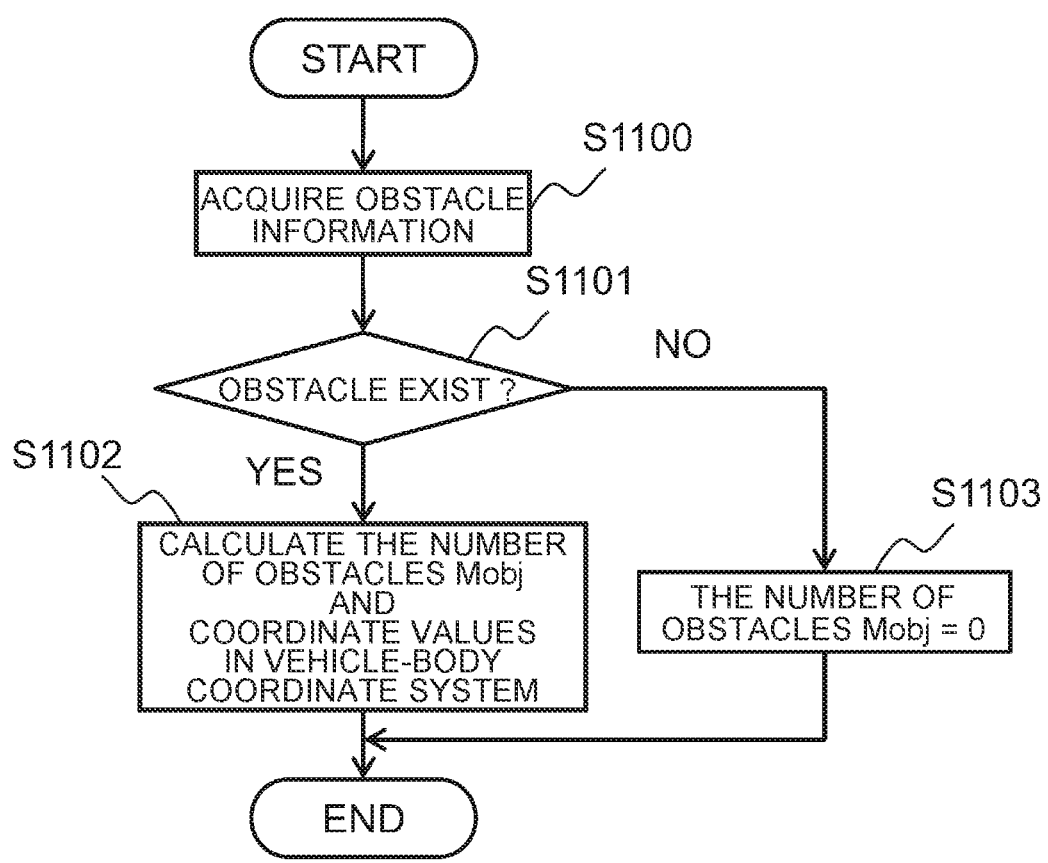
FIG. 8 is a flowchart of the processing of positional relationship determination according to an embodiment of the present invention.

The flow of obstacle information acquisition processing by the obstacle information acquisition section 211 is described. FIG. 8 is the flow of determination processing on positional relationship with an obstacle.

Step S1100

The obstacle information acquisition section 211 obtains obstacle information from the obstacle DB 310.

Step S1101

The obstacle information acquisition section 211 refers to the obstacle information obtained from the obstacle DB 310 and determines the presence or absence of an obstacle/obstacles around the hydraulic excavator 100. The obstacle information acquisition section 211 determines the presence or absence, for example, by use of the number of pieces of positional information transmitted as obstacle information.

Step S1102

If the presence of an obstacle/obstacles is determined in step S1101, the obstacle information acquisition section 211 sets the number of obstacles to obstacle count Mobj (Mobj is an integer of 1 or greater). Also, for each obstacle, the obstacle information acquisition section 211 converts the positional information into values in the vehicle-body coordinate system 900, then temporarily stores as converted obstacle information on the storage medium 155 and/or the like, and terminates the processing.

Step S1103

It is noted that if the absence of an obstacle is determined in step S1101, the obstacle information acquisition section 211 sets the obstacle count Mobj (Mobj is an integer of 1 or greater) to zero, which is then held as converted obstacle information, and terminates the processing.

Figure 9:
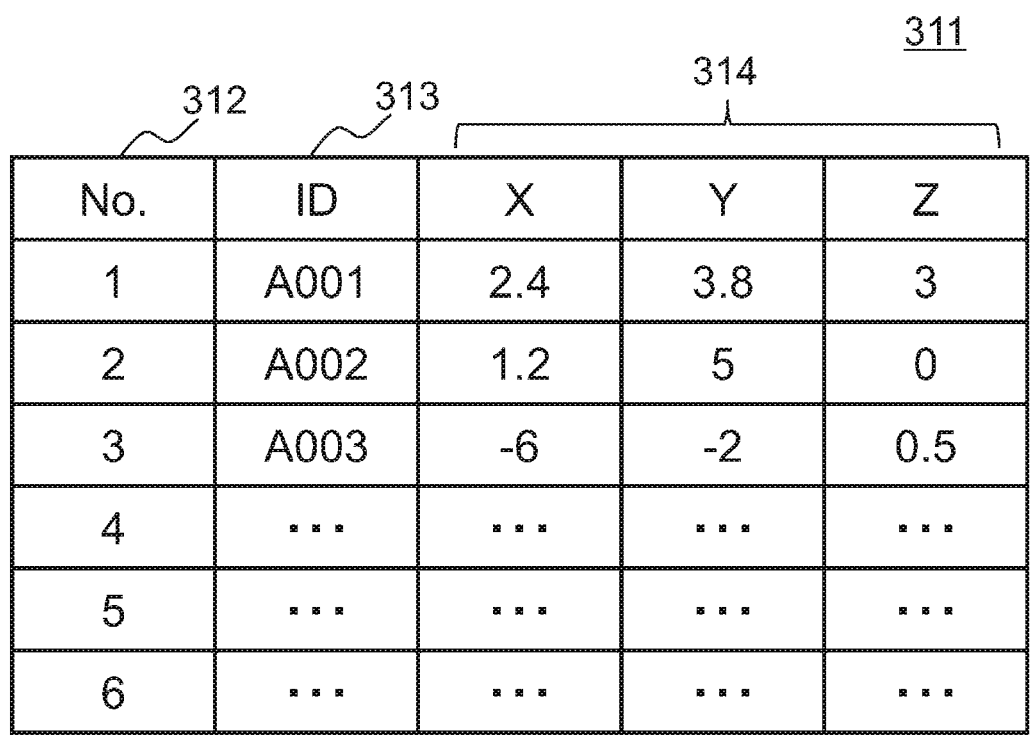
FIG. 9 is an explanatory diagram for illustrating an example of converted obstacle information according to an embodiment of the present invention.

Here, an example of the converted obstacle information is shown in FIG. 9. The converted obstacle information 311 in the embodiment holds the positional information (x, y, z) 314 on each obstacle. It is noted that an obstacle ID 313 may be assigned to each obstacle and held together. Also, a record number 312 may be assigned to each obstacle and the record numbers may be additionally held.

Terrain Information Acquisition Section

The terrain information acquisition section 221 obtains information on terrain feature around the hydraulic excavator 100, at predetermined time intervals from the terrain DB 320, and then converts it to the vehicle-body coordinate system 900 to generate converted terrain information. The converted terrain information thus generated is output to the terrain information reliability evaluation section 222 and the working region setting section 223.

Figure 10:
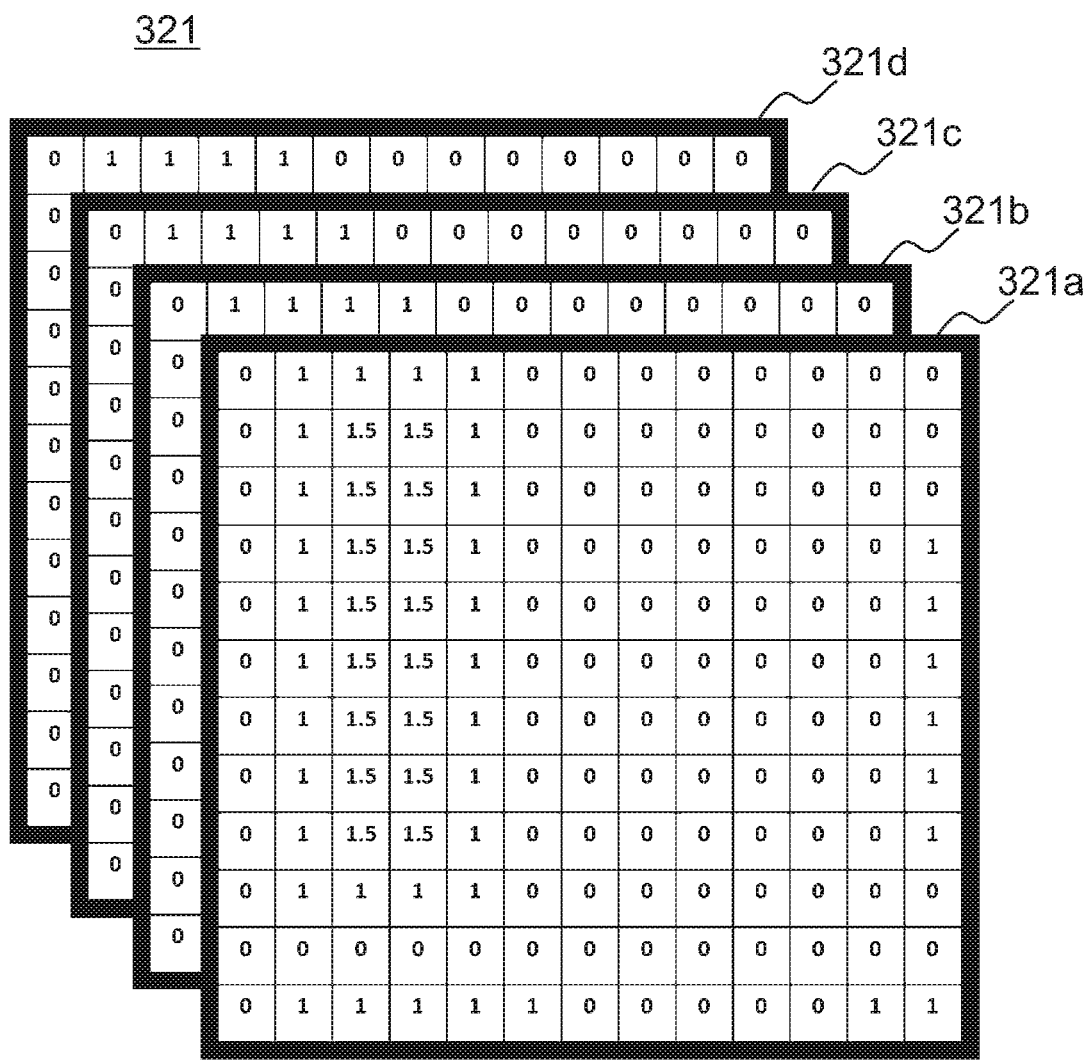
FIG. 10 is an explanatory diagram for illustrating an example of converted terrain information according to an embodiment of the present invention.

Here, an example of the converted terrain information is shown in FIG. 10. As illustrated in the figure, for each of grid-shaped regions into which a predetermined region is divided, the converted terrain information 321 in the embodiment includes height 321a, material information (material data) 321b, a data-acquiring time 321c, and a data-acquiring sensor type 321d.

The predetermined region refers to, for example, a view region of a sensor from which the terrain information is obtained, a cover region of map data retained externally, a view region of the external recognition sensor 156 from which the obstacle information is obtained, or the like. Also, the material information 321b may be, for example, information in which material itself such as earth, stones, rocks and the like is identified, or the hardness of the region.

Also, the size of a grid-shaped region is predefined with consideration given to the processing capacity of the information controller 161, and the available storage space of the storage medium 155.

Terrain Information Reliability Evaluation Section

The terrain information reliability evaluation section 222 calculates a degree of reliability of the terrain information, from the converted terrain information 321 received from the terrain information acquisition section 221. The degree of reliability of the terrain information is calculated based on the time at which the terrain information is acquired, and the type of acquisition sensor. The degree of reliability is calculated for each grid-shaped region. The calculation result of the terrain information reliability evaluation section 222 is hereinafter referred to as a "reliability map". The calculated reliability map is output to the working region setting section 223.

Figure 11:
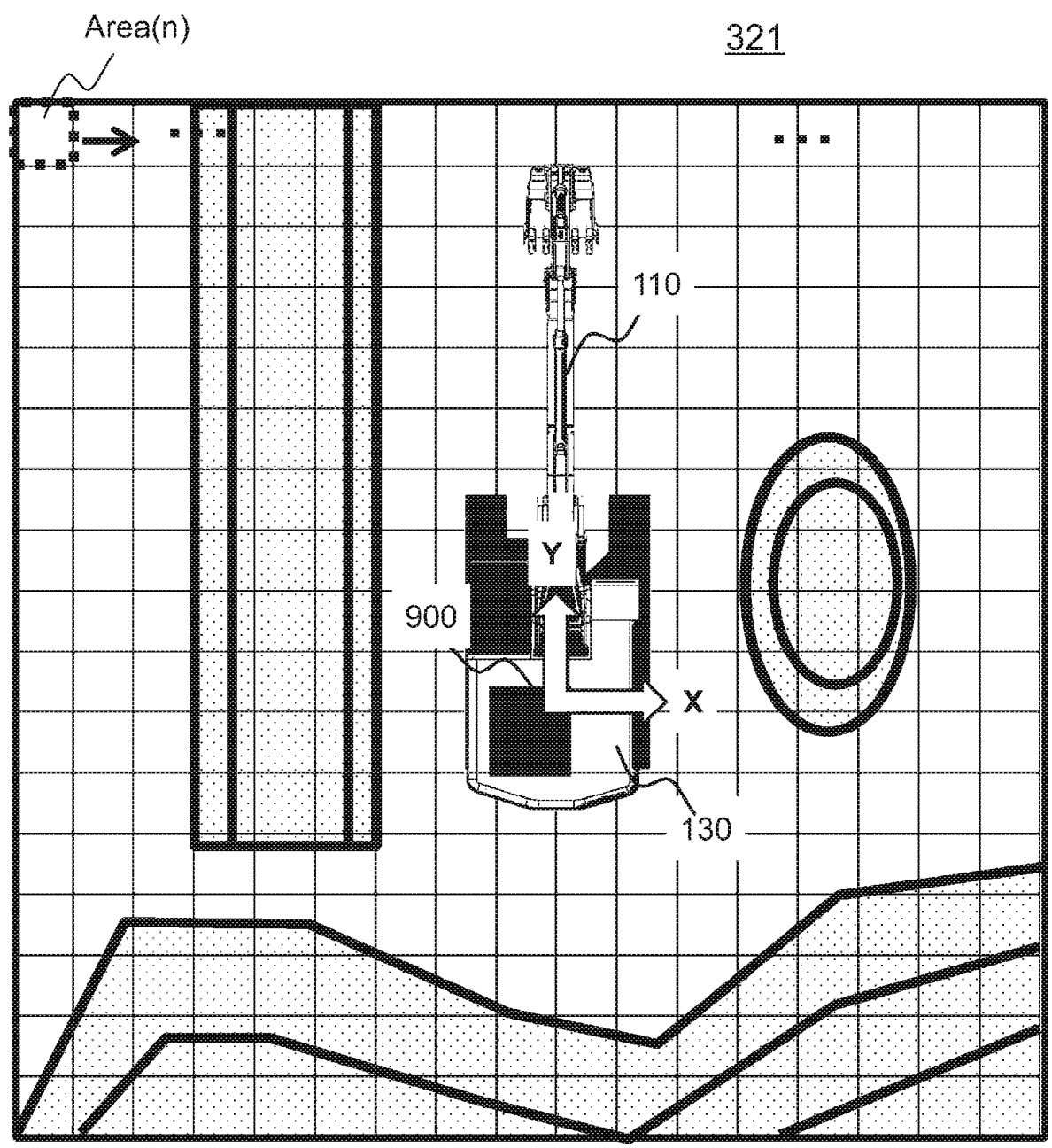
FIG. 11 is an explanatory diagram for illustrating reliability map calculation processing according to an embodiment of the present invention.
Figure 12:
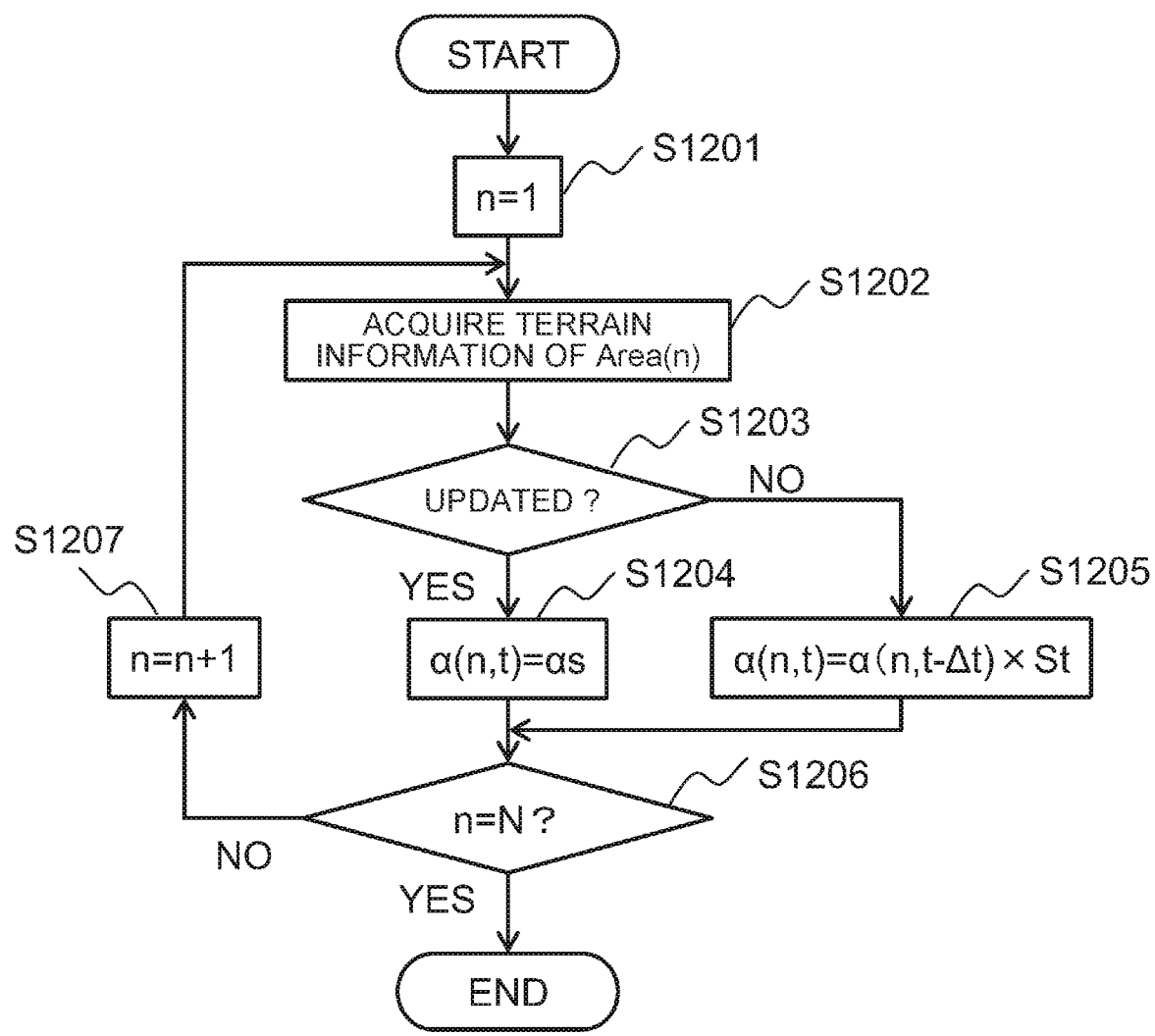
FIG. 12 is a flowchart of the reliability map calculation processing according to an embodiment of the present invention.

Here, the reliability map calculation processing by the terrain information reliability evaluation section 222 is described. FIG. 11 is a diagram for illustrating the reliability map calculation processing according to the embodiment, and FIG. 12 is a processing flow of the reliability map calculation processing.

As illustrated in FIG. 11, the terrain information reliability evaluation section 222 determines the degree of reliability of the converted terrain information 321 for each of the grid-shaped regions in the order predefined. It is noted that the hydraulic excavator 100 is depicted in FIG. 11 for the purpose of clearly illustrating the coordinate system and the like, but the actual converted terrain information 321 may not include the information of the hydraulic excavator 100. In the following, this is the same as the figure of other converted terrain information 321.

As described above, the terrain information acquisition section 221 generates converted terrain information 321 at predetermined time intervals, and every reception of the converted terrain information 321, the terrain information reliability evaluation section 222 performs the processing. Assuming hereinafter that the terrain information acquisition section 221 performs the processing at Δt intervals, and timing at which latest converted terrain information 321 is received is t.

Hereinafter, an n-th grid-shaped region is referred to as Area(n), and a degree of reliability pertinent to Area(n) set at time t is referred to as α(n, t). Incidentally, n is an integer of 1 or greater.

Step S1201

As illustrated in FIG. 12, initially, the terrain information reliability evaluation section 222 substitutes 1 for n functioning as a counter of the processing.

Step S1202

The terrain information reliability evaluation section 222 acquires the converted terrain information pertinent to the grid-shaped region Area(n). Here, the terrain information reliability evaluation section 222 acquires the height 321a of the region in question, the material information 321b, the time at which data is acquired (data-acquiring time) 321c, and the data-acquiring sensor type 321d. It is noted that the terrain information reliability evaluation section 222 stores these items of information temporarily in association with time t on the storage medium 155.

Step S1203

Subsequently, the terrain information reliability evaluation section 222 determines whether or not the terrain information pertinent to the grid-shaped region Area(n) is updated. Here, the terrain information reliability evaluation section 222 compares the data-acquiring time 321c of the grid-shaped region Area(n) with the last-acquired data-acquiring time 321c of the same region. If both agree with each other, the terrain information reliability evaluation section 222 determines that updating is performed, but if both disagree with each other, the terrain information reliability evaluation section 222 determines that updating is not performed.

Step S1204

Subsequently, the terrain information reliability evaluation section 222 sets a degree of reliability $\alpha(n, t)$ of the grid-shaped region Area(n) at a time t. At this time, if it is determined at step S1203 that updating is performed (Yes), the terrain information reliability evaluation section 222 sets, to $\alpha(n, t)$, a degree of reliability $\alpha s$ pre-associated with the sensor from which the terrain information in question is obtained. It is noted that the degree of reliability $\alpha s$ for each sensor is pre-held in the storage medium 155, and/or the like.

Step S1205

On the other hand, if it is determined at step S1203 that updating is not performed (No), the terrain information reliability evaluation section 222 multiplies the reliability $\alpha n(t-\Delta t)$ of the terrain information at a time $(t-\Delta t)$ by a coefficient St, and then sets the product to $\alpha n(t)$. It is noted that the coefficient St is preset in accordance with an elapsed time ($\Delta t$) from the previous processing, and a sensor type, and retained on the storage medium 155 and/or the like.

Steps S1206, S1207

The terrain information reliability evaluation section 222 determines whether or not the processing is terminated for all the grid-shaped regions (n=N?). If there is a not-yet-processed region, the terrain information reliability evaluation section 222 increments n by one (n=n+1), and then returns the process to step S1202.

Upon termination of the processing for all the grid-shaped regions, the terrain information reliability evaluation section 222 outputs the degree of reliability $\alpha(n, t)$ at a time t for each Area(n), as a reliability map at the time t to the working region setting section 223, followed by termination of the processing.

Machine State Acquisition Section

The machine state acquisition section 231 calculates machine states from the outputs of angle detectors 181, 182, 183, 184 which are installed in the multijoint front working device 110. It is noted that, in the specification, a position, a speed and a swing radius of each component of the multijoint front working device 110 are referred to as "machine states". The machine states are calculated from outputs $\theta 1$, $\theta 2$, $\theta 3$, $\theta 4$ of the angle detectors 181, 182, 183, 184 of the upperstructure 131, the boom 111, the arm 112 and the bucket 113. The position of each component is represented by coordinate values of the vehicle-body coordinate system 900. Also, the calculated machine states, together with calculation times, are held on the storage medium 155. The machine states are also output to the operation state determination section 232 and the working region setting section 223.

Operation State Determination Section

The operation state determination section 232 calculates a swing angular speed $\omega bkt$ of the multijoint front working device 110, from the machine states calculated by the machine state acquisition section 231. The calculation is performed, for example, using the positional information of the distal end of the multijoint front working device 110, the distal end being a part farthest from the swing center of the upperstructure 131. Specifically, the operation state determination section 232 calculates the swing angular speed $\omega bkt$ of the multijoint front working device 110 by use of the distal end's position information stored on the storage medium 155 in association with the latest calculation time, and the distal end's position information stored in association with the past calculation times. In the embodiment, the swing angular speed $\omega bkt$ of the multijoint front working device 110 is referred to as an operation state.

Working Region Setting Section

The working region setting section 223 sets a working region within the range of converted terrain information 321 by use of the converted terrain information, the reliability map and the machine state. Specifically, the working region setting section 223 determines whether each grid-shaped region in the converted terrain information 321 is a working region or a non-working region, and sets the determination result for each grid-shaped region, so as to create a working region map. The created working region map is output to the proximity calculation section 224.

It is noted that, in the specification, a working region is defined as a region reachable by the hydraulic excavator 100 on the basis of the state of the hydraulic excavator 100. The working region setting section 223 performs the working region setting processing to set a working region, every time any new item of information described above is received. It is noted that the working region setting processing may be pre-configured to be performed when specified information is newly received.

Figure 13:
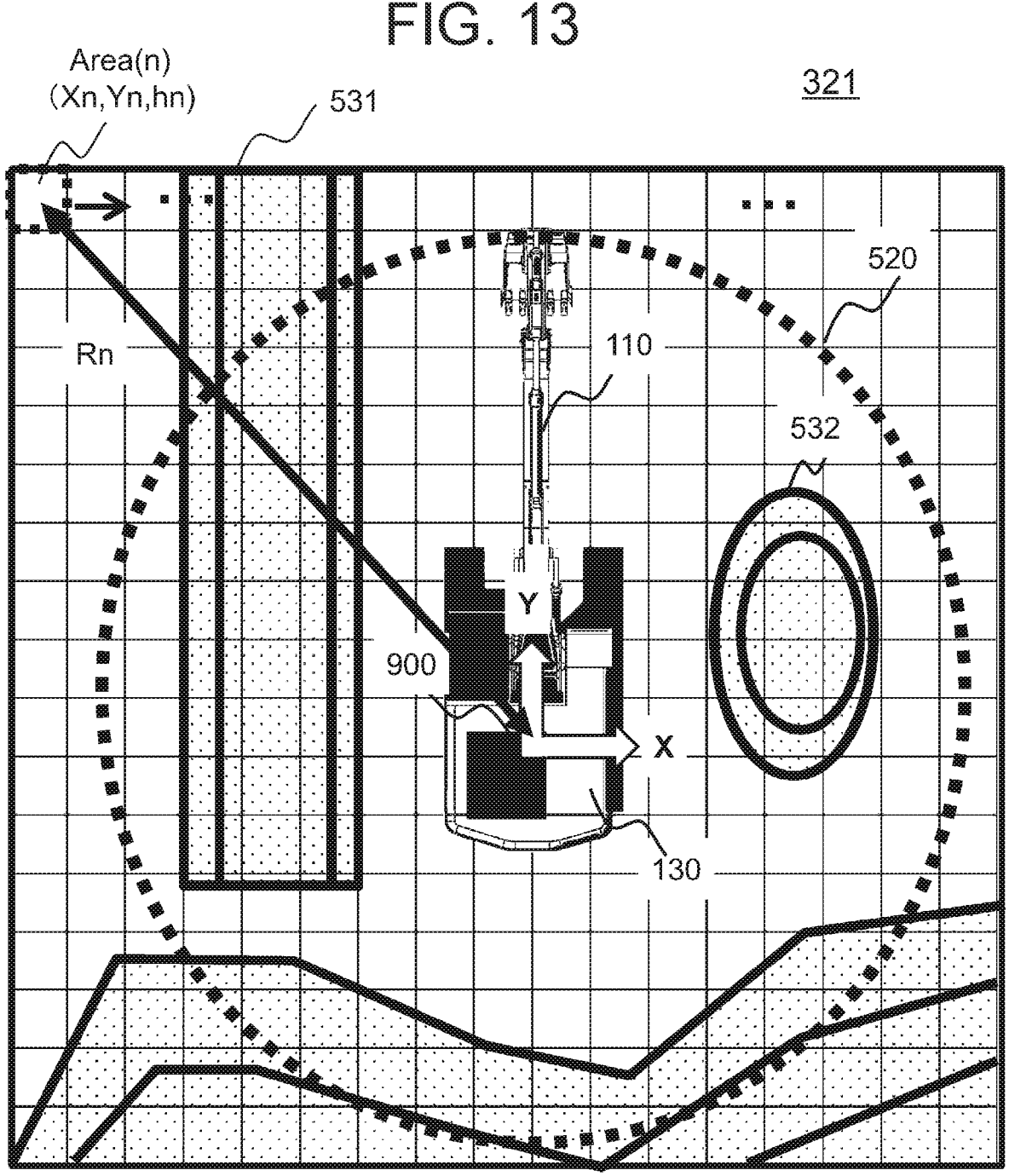
FIG. 13 is an explanatory diagram for illustrating working region setting processing according to an embodiment of the present invention.
Figure 14:
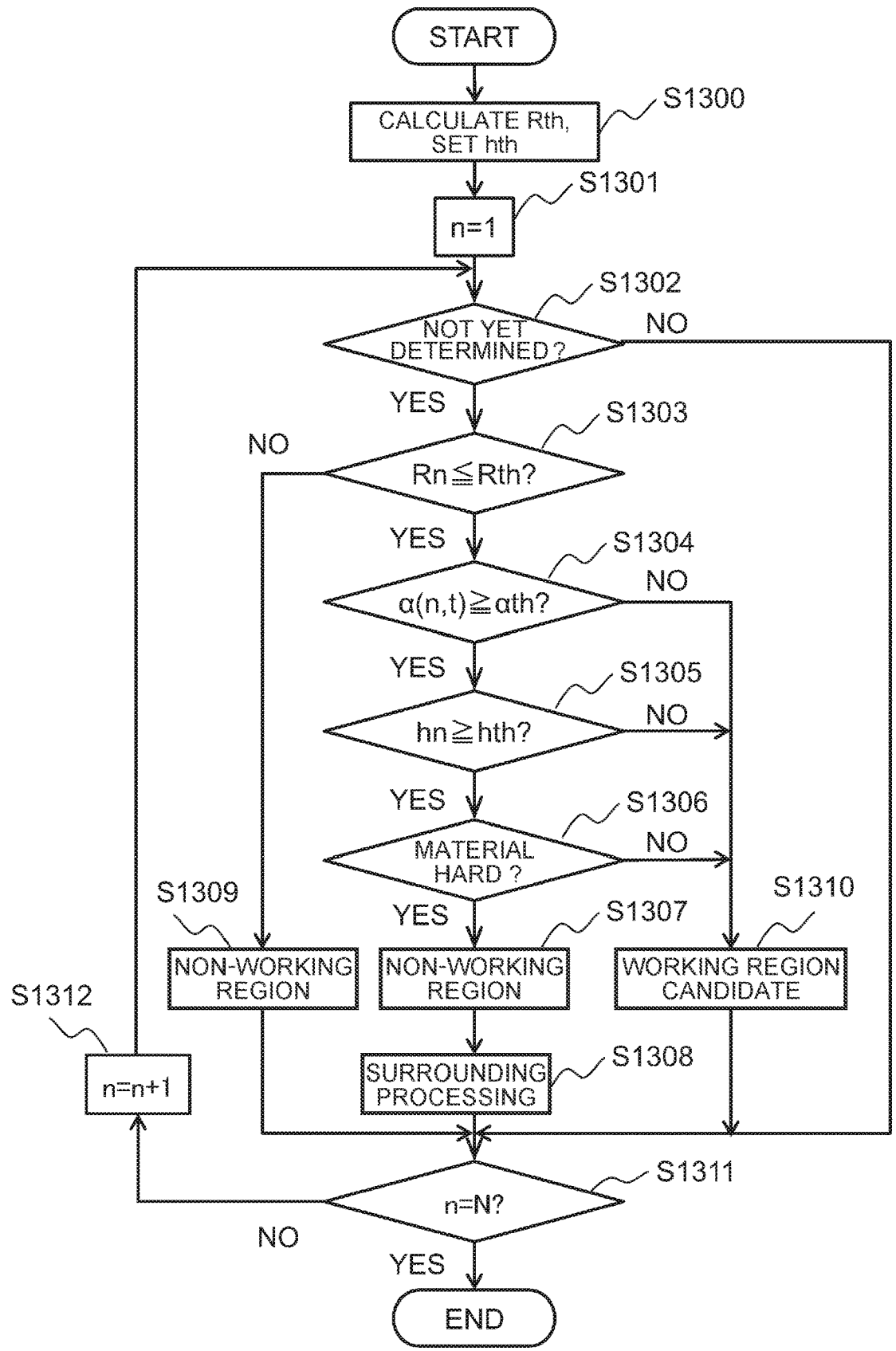
FIG. 14 is a flowchart of the working region setting processing according to an embodiment of the present invention.
Figure 15:
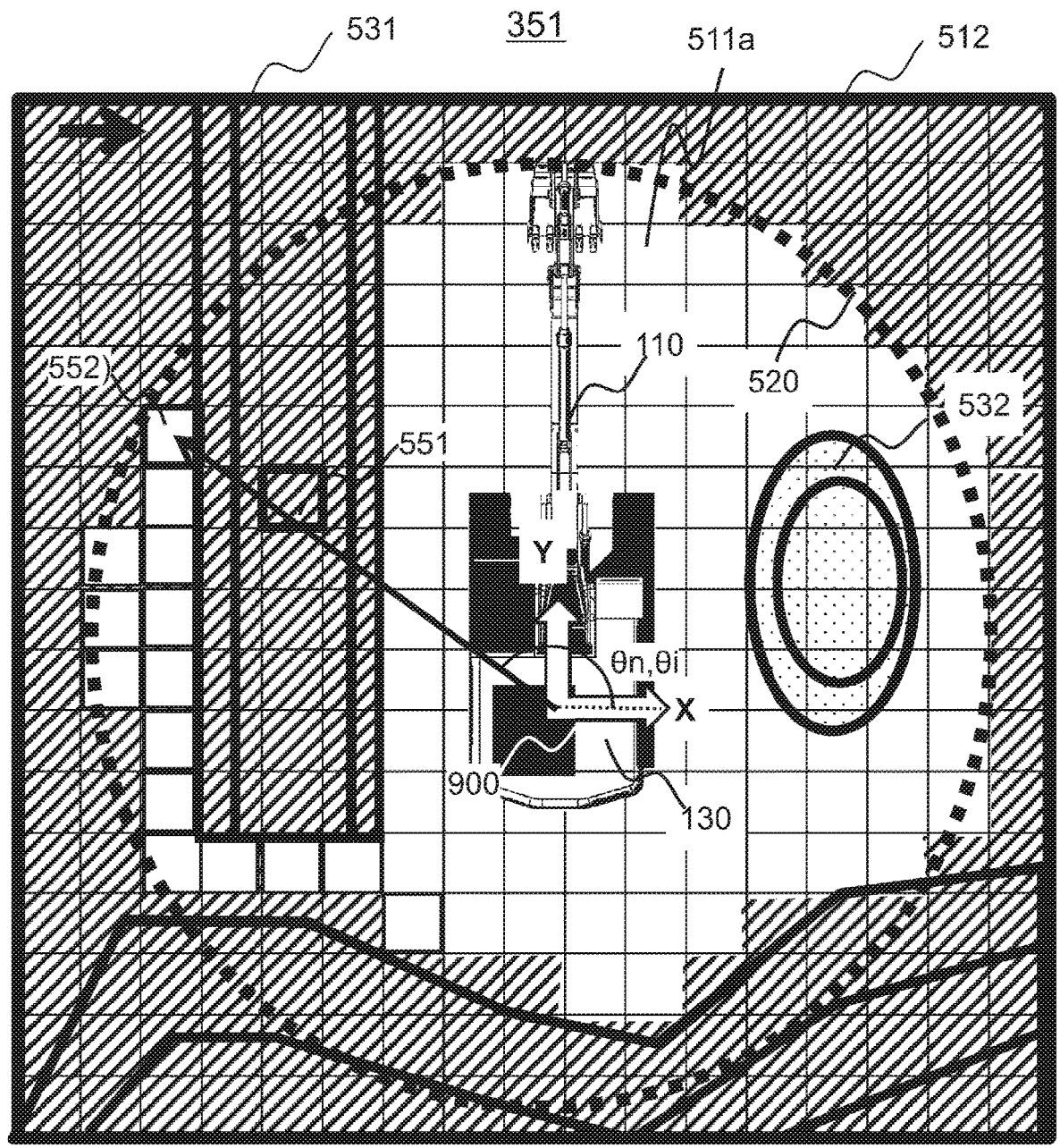
FIG. 15 is an explanatory diagram for illustrating surrounding processing in the working region setting processing according to an embodiment of the present invention.
Figure 16:
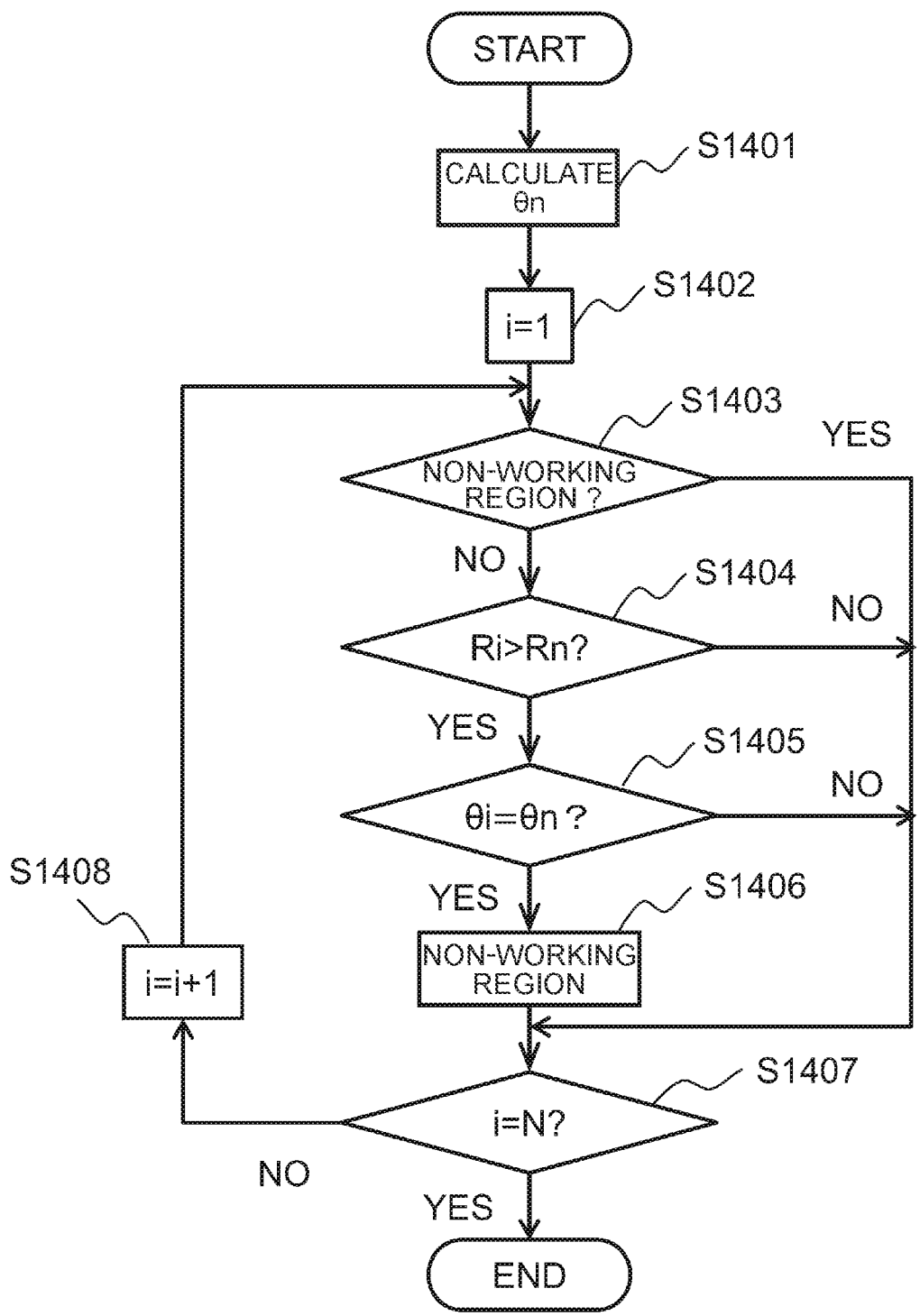
FIG. 16 is a flowchart of the surrounding processing in the working region setting processing according to an embodiment of the present invention.
Figure 17:
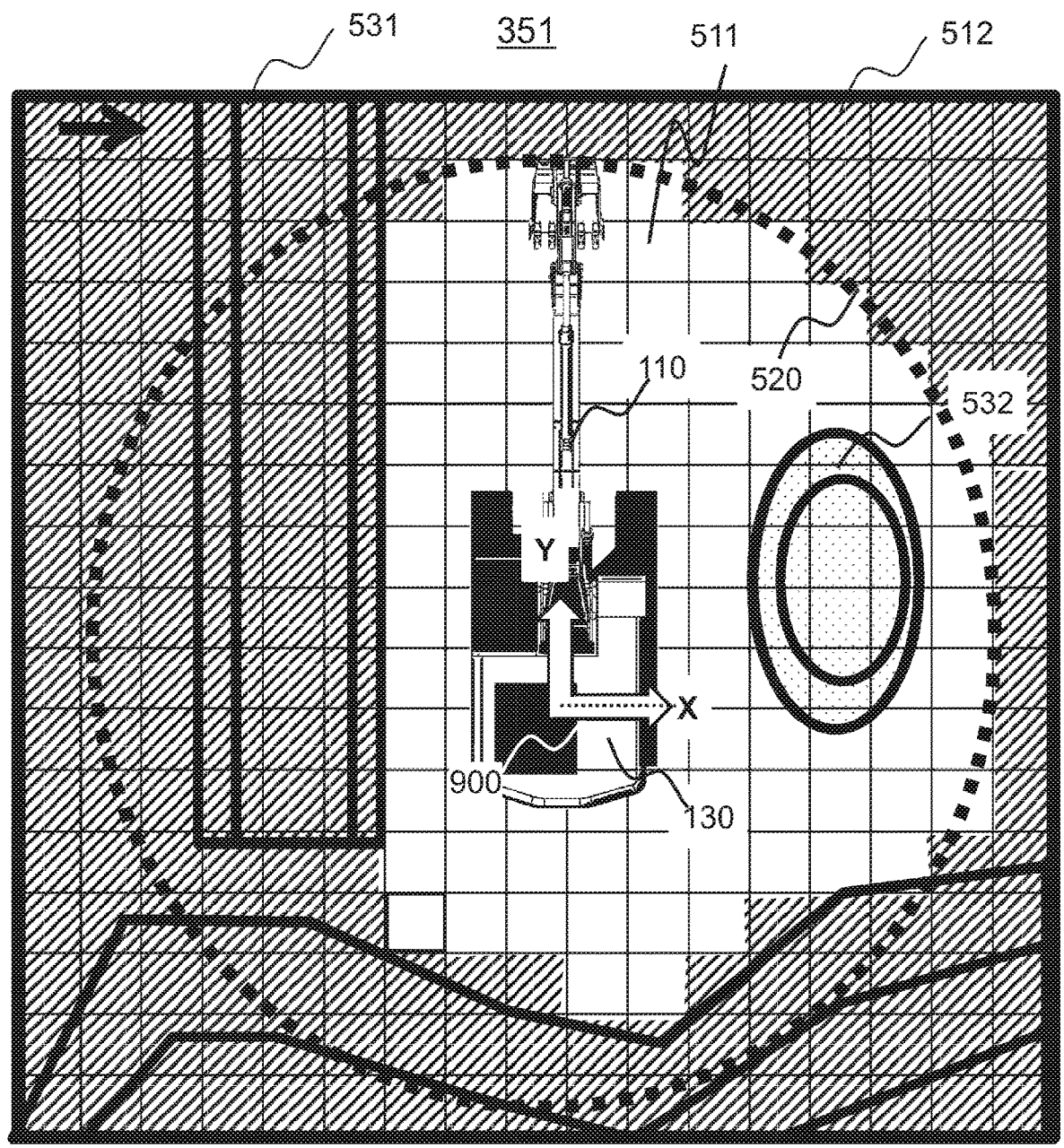
FIG. 17 is an explanatory diagram for illustrating an example of working region map according to an embodiment of the present invention.

The working region setting processing by the working region setting section 223 is described with reference to FIG. 13 to FIG. 17. FIGS. 13, 15, 17 are explanatory diagrams of an overview of the working region setting processing. FIG. 14 and FIG. 16 are the processing flows of the working region setting processing.

As described above, in the specification, the working region is a region reachable by the hydraulic excavator 100 as described above. Specifically, the working region is a region reachable by the hydraulic excavator 100 when the upperstructure 131 swings under conditions in which the multijoint front working device 110 maintains the current work state.

An example is illustrated in FIG. 13. FIG. 13 shows a work state where the bucket 113 is in a position farthest from the swing center of the upperstructure 131 of the multijoint front working device 110 and also in a position corresponding to the lowermost end of the multijoint front working device 110. As illustrated in FIG. 13, the working region is basically inside the circumference 520 that is centered at the origin in the xy plane in the vehicle-body coordinate system 900, and has, as a radius, a line segment connecting the origin and a xy projection point in the distal end position of the bucket 113. The circumference 520 is hereinafter referred to as a working-device reach circle 520.

However, as described with reference to FIG. 5A and FIG. 5B, there are undulations in the actual terrains around the hydraulic excavator 100. For example, as illustrated in FIG. 13, included are: a mount 531 which is on the stable ground and higher than an altitude of the distal end position of the bucket 113; potentially collapsing earth and sand 532 reaching an altitude higher than an altitude of the distal end position of the bucket 113; and the like. Therefore, for example, even if a region on the top and at the rear of the mount 531 and the like is inside the working-device reach circle 520, the region is not the reachable region by the hydraulic excavator 100.

In the embodiment, the working region is set by taking such terrain information into account. Therefore, the working region setting section 223 initially identifies a region which is an unequivocally non-working region, in the working region setting process. It is noted that a unequivocally non-working region refers to a region outside the working-device reach circle 520, and a region inside the working-device reach circle 520 where the terrain data has a predetermined degree of reliability, the ground is hard, and also the altitude is higher than the lowermost end of the multijoint front working device 110 (high-altitude region; e.g., mount 531). On the other hand, even a region which is inside the working-device reach circle 520 and in which the terrain data has a low degree of reliability, and even a region which is inside the working-device reach circle 520 and is at an altitude higher than the lowermost end of the multijoint front working device 110, if the region is on soft ground (e.g., the earth and sand 532), the region is not identified as a non-working region.

And, the regions except for the non-working regions are assumed as working region candidates, and the working region candidates are assessed in more detail to identify non-working regions or working regions. For example, in the embodiment, a region on the far side of the mount 531 in the radius direction from the hydraulic excavator 100 is assumed as a non-working region even if the region is inside the working-device reach circle 520.

A processing flow of an approach for setting a working region by the above-described approach will be described below along FIG. 14 and FIG. 16.

In the working region setting processing, a determination is made for each grid-shaped region Area(n) in the converted terrain information 321. In the following, assuming that, for an Area(n) center position in a xy plane, the coordinates in the vehicle-body coordinate system 900 are (Xn, Yn), and the altitude is hn. Further, a reliability threshold αth used in the reliability determination is pre-held on the storage medium 155 and/or the like.

Step S1300

The working region setting section 223 uses the machine state to calculate the threshold (radius threshold) Rth in the radius direction, and also sets a threshold (height threshold) hth in the height direction.

The radius threshold Rth is calculated from Rth= $\sqrt{((Xb)^2+(Yb)^2)}$+Kr. Here, Xb, Yb represent a position of the distal end of the multijoint front working device 110, which is a part farthest from the swing center of the upperstructure 131, in the horizontal plane (xy plane), i.e., xy coordinate. And Kr is a preset value. Also, the height threshold hth is calculated from hth=hb+Kh. Here, hb is the height of the multijoint front working device 110 in a position closet to the ground (lowermost end). And Kh is a preset value.

The radius threshold Rth and the height threshold hth are uniquely determined from values of the angle detectors 181, 182, 183. Therefore, for example, pre-calculation may be performed and the obtained value may be stored on the storage medium 155.

Step S1301

Initially, counter n is set to one.

Step S1302

Subsequently, the working region setting section 223 determines whether or not a grid-shaped region of interest to be determined (region of interest) Area(n) is a region which is already determined as a working region. If the region of interest is determined as a not-yet-determined region, i.e., a pending region, the working region setting section 223 proceeds the process to step S1303, whereas if it is determined as a determined region, the working region setting section 223 proceeds the process to step S1311.

In the embodiment, as described later, surrounding processing is performed in step S1308. In the surrounding processing, without regard for the processing order, a determination may possibly be performed in first on the region of interest. To avoid such a duplicate determination on a region, this processing is performed.

Step S1303

If a pending region is determined at step S1303 (Yes), the working region setting section 223 determines whether or not the region of interest Area(n) is inside the working-device reach circle 520. Here, the working region setting section 223 determines by comparison between a distance Rn from the origin to the center coordinates (Xn, Yn) of the region of interest Area(n) and a radius threshold Rth. It is noted that the distance Rn is calculated from Rn= $\sqrt{((Xn)^2+(Yn)^2)}$.

If the distance Rn is greater than the radius threshold Rth (Rn>Rth), the working region setting section 223 determines that the region of interest Area(n) is outside the working-device reach circle 520, and proceeds the process to step S1309. On the other hand, if the distance Rn is equal to or less than the radius threshold Rth (Rn≤Rth), the working region setting section 223 determines that the region of interest Area(n) is inside the working-device reach circle 520, and proceeds the process to step S1304.

Step S1309

Here, the working region setting section 223 determines the region of interest Area(n) as a non-working region. For example, the working region setting section 223 registers information meaning the region is a non-working region in a region, corresponding to the region of interest Area(n), of the regions for the working region map preset in the storage medium 155.

Step S1304

If it is determined at step S1303 that the region of interest Area(n) is inside the working-device reach circle 520, the working region setting section 223 determines whether or not the terrain information pertinent to the region of interest Area(n) is sufficiently reliable. Here, the working region setting section 223 determines whether a degree of reliability $\alpha(n, t)$ of the latest terrain information pertinent to the region of interest Area(n) is equal to or greater than the reliability threshold $\alpha$th.

If the degree of reliability $\alpha(n, t)$ is less than the reliability threshold $\alpha$th ($\alpha(n, t) < \alpha$th), the working region setting section 223 proceeds the process to step S1310. On the other hand, If the degree of reliability $\alpha(n, t)$ is equal to or greater than the reliability threshold $\alpha$th ($\alpha(n, t) \geq \alpha$th), the working region setting section 223 proceeds the process to step S1305. That is, in the case where the degree of reliability is low, the working region setting section 223 temporarily considers the region of interest Area (n) as a working region candidate without performing subsequent determinations.

Step S1310

Here, the working region setting section 223 sets the region of interest Area(n) as a working region candidate. For example, the working region setting section 223 registers information meaning the region is a working region in a region, corresponding to the region of interest Area(n), of the regions for the working region map in the storage medium 155.

Step S1305

If a sufficient degree of reliability is determined, the working region setting section 223 determines whether or not the altitude hn of the region of interest Area(n) is equal to or greater than the height threshold hth. The altitude hn uses a height 321a in the converted terrain information. If hn is determined equal to greater than hth (hn≥hth), the working region setting section 223 proceeds the process to step S1306. If hn is determined less than hth (hn<hth), the working region setting section 223 proceeds the process to step S1310.

Step S1306

If it is determined that the altitude hn of the region of interest Area(n) is equal to or greater than the height threshold hth, the working region setting section 223 determines the material of the region of interest Area(n). Here, if the material of the terrain in the region of interest Area(n) is material on stable ground such as a building, a mount and the like, the working region setting section 223 determines that the material is hard material, but if the material is apt to collapse such as earth and sand, the working region setting section 223 determines that the material is not hard material. If the material is determined to be hard material, the working region setting section 223 proceed the process to step S1307, otherwise proceeds the process to step S1310.

The determination is performed using the Area(n) material information 321b. In the case where the material information 321b is, for example, the working region setting section 223 registers preliminarily information specifying material itself, whether or not the material is hard for each material on the storage medium 155 and/or the like. For example, lock, concrete and the like are registered as hard. Materials that are not registered are not determined as hard material.

Also, in the case where a hardness of material is registered as material information 321b, the working region setting section 223 sets a hardness threshold as a criterion, and if material has a hardness higher than the threshold, the working region setting section 223 determines the material to be hard material.

Step S1307

Here, the working region setting section 223 sets the region of interest Area(n) as a non-working region. For example, the working region setting section 223 registers information meaning the region is a non-working region in a region, corresponding to the region of interest Area(n), of the regions for the working region map in the storage medium 155. Then, the working region setting section 223 proceeds the process to step S1308 for the surrounding processing.

Step S1308

Here, the working region setting section 223 performs the surrounding processing and determines whether or not a region to be set as a non-working region exists in the grid-shaped regions set as the working region candidates. In the surrounding processing, the working region setting section 223 sets a region to be the non-working region in the working region candidates as the non-working region, and sets the remaining regions as the working region. The surrounding processing will be described in detail later.

Steps S1311, S1312

Then, the working region setting section 223 determines whether or not determination is finished being performed on all the grid-shaped regions (n=N?). If not finished, the working region setting section 223 increments the counter n by one, and then returns the process to step S1302 to repeat the processing.

On the other hand, if the determination is finished being performed on all the gird-shaped regions, the working region setting section 223 sets the working region candidates in the working region map as working regions, and terminates the working region determination processing.

Here, the surrounding processing in step S1308 is described. FIG. 15 illustrates an example of the working region map 351 in progress. Here, assuming that the working region setting section 223 performs the determination processing on the grid-shaped regions in the converted terrain information 321 in the order from the upper left region in the figure on a row-by-row basis in the arrow direction, by way of example. Also, in FIG. 15, the working region candidate regions 511a are not hatched and the non-working regions 512 are hatched.

For example, a region 552 in the working region map 351 is determined to be a working region only from the positional and altitude information. Assuming that the material of the region 552 is insufficient in reliability. However, actually, the mount 531 on robust ground is located between the hydraulic excavator 100 and the region 552, and therefore the hydraulic excavator 100 (the bucket 113 in the figure) is not able to reach the region 552, so that the region 552 corresponds to a non-working region.

In the surrounding processing, such a region is surely set as a non-working region. That is, when the working region setting processing is performed on any region 551 between the region 552 and the origin, the working region setting section 223 performs determination additionally on the region 552.

FIG. 16 is a processing flow of the surrounding processing (step S1308 described above) by the working region setting section 223 according to the embodiment. In the surrounding processing, the working region setting section 223 sets, of the regions determined to be the working region candidates, the region determined to be a non-working region in the above-described step S1307, and regions located in the same direction as the radius direction and in the direction of increasing the distance, as non-working regions.

Step S1401

The working region setting section 223 calculates $\theta n = \cos^{-1}(Xn/Rn)$ on the basis of a position (coordinates (Xn Yn)) of the grid-shaped region Area(n). Here, Rn is a distance from the origin to Area(n). It is noted that $\theta n$ calculated is a variation angle from the positive x axis in the Area(n) direction.

Step S1402

After that, the working region setting section 223 performs determination on each grid-shaped region Area(i) in the converted terrain information 321 in the order. The letter i is an integer not less than 1 and not more than N. Initially, number 1 is set as i.

Step S1403

The working region setting section 223 searches the storage medium 155 for the grid-shaped region Area(i), and determines whether or not the grid-shaped region Area(i) is already determined to be the non-working region.

Then, if the region has been already determined to be the non-working region, the working region setting section 223 proceeds the process to step S1407. On the other hand, if the region has been determined to be the pending region or the working region candidate, the working region setting section 223 proceeds the process to step S1404.

Step S1404

Subsequently, the working region setting section 223 determines the positional relationship of the grid-shaped region Area(i) with the region of interest Area(n). Then, if the grid-shaped region Area(i) is located closer to the hydraulic excavator 100 than the region of interest Area(n) is located, the working region setting section 223 determines the grid-shaped region Area(i) as the working region candidate without any change as previously determined. Here, the working region setting section 223 performs determination by comparing Rn and a distance Ri from the origin to the grid-shaped region Area(i). It is noted that Ri is calculated from $Ri = \sqrt{(Xi^2 + Yi^2)}$.

Here, if Ri is equal to or less than Rn (Ri≤Rn), the grid-shaped region Area(i) is located closer to the hydraulic excavator 100 than the region of interest Area(n) is located, so that the working region setting section 223 proceeds the processing directly to step S1407. On the other, if Ri is greater than Rn (Ri>Rn), the working region setting section 223 proceeds the process to step S1405.

Step S1405

Subsequently, the working region setting section 223 makes a comparison between the direction of the grid-shaped region Area(i) and the direction of the region of interest Area(n). If the directions are not the same, the working region setting section 223 determines the grid-shaped region Area(i) as the working region candidate without any change as previously determined. The determination is performed using a variation angle $\theta i$ of Area(i) and a variation angle $\theta n$ of Area(n). $\theta i$ is calculated from $\theta i = \cos^{-1}(Xi/\sqrt{(Xi^2 + Yi^2)})$.

If the variation angle $\theta i$ is different from the variation angle $\theta n$, the grid-shaped region Area(i) is different in direction from the region of interest Area(n), so that the flow goes directly to step S1407. On the other hand, if $\theta i$ is equal to $\theta n$, the direction of the grid-shaped region Area(i) is the same as the direction of the region of interest Area(n). Stated another way, this is the relationship between the region 551 in FIG. 15 and the region 552. In this case, the working region setting section 223 proceeds the processing directly to step S1406.

Step S1406

Here, the working region setting section 223 sets Area(i) as a non-working region, and proceeds the process to step S1407.

Steps S1407, S1408

Then, the working region setting section 223 determines whether or not determination is finished being performed on all the grid-shaped regions (i=N?). If not finished, the working region setting section 223 increments the counter i by one, and then returns the process to step S1403 to repeat the surrounding processing.

On the other hand, if the determination is finished being performed on all the grid-shaped regions, the working region setting section 223 terminates the surrounding processing.

FIG. 17 illustrates an example of the working region map 351 created through the working region determination processing and the surrounding processing by the working region setting section 223. In FIG. 17, the non-hatched regions are a working region 511 and the non-working regions 512 are hatched.

As illustrated in FIG. 17, for example, even inside the working-device reach circle 520, the mount 531 higher than the height of the lowermost end of the multijoint front working device 110 and an area behind the mount 531 are set as non-working regions 512. It is noted that, in the example in FIG. 17, the lowermost end of the multijoint front working device 110 corresponds to the lowermost end of the bucket 113. Also, when seen from the hydraulic excavator 100 in the direction toward the mount 531, the areas behind the mount 531 are regions at a longer distance than the mount 531. Also, even if a region in which the material is determined to be the earth and sand 532 or the like is located higher than the height of the bucket 113, the region is set as a working region 511 as long as it is inside the working-device reach circle 520.

It is noted that in the working region setting processing, the working regions are set using all the conditions of the degree of reliability of the terrain data, the height of the terrain, position, material and the like. However, all the conditions may not be necessarily used. Also, the determination order is not limited to that in the above approach.

Proximity Calculation Section

The proximity calculation section 224 calculates a proximity of each obstacle using the converted obstacle information, the working region map 351, the machine states and the operation state. Proximity is a value indicating a predefined degree (level) of proximity between the hydraulic excavator 100 and an obstacle.

Figure 18:
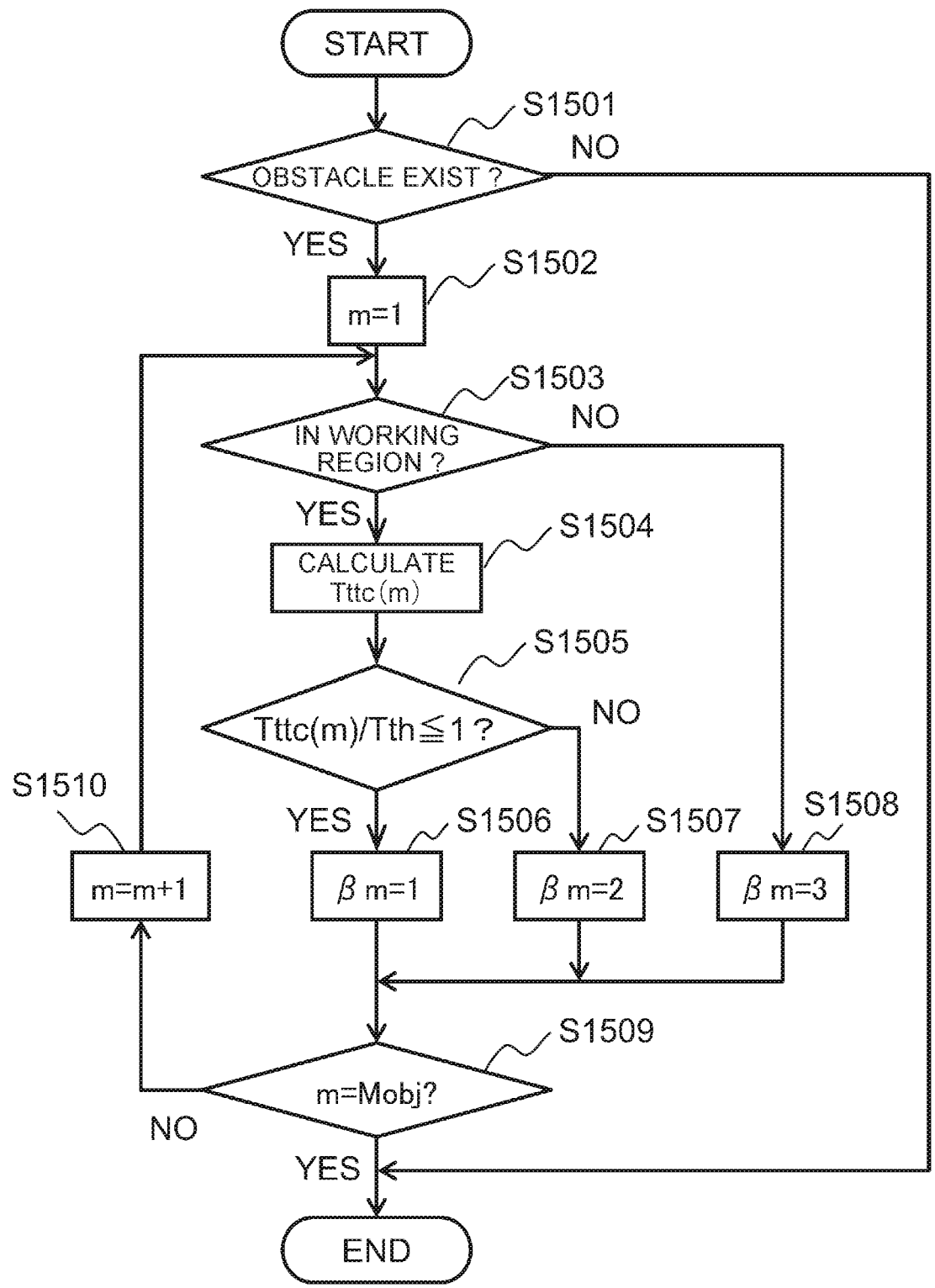
FIG. 18 is a flowchart of proximity calculation processing according to an embodiment of the present invention.

The proximity calculation processing by the proximity calculation section 224 is described in detail. FIG. 18 is a processing flow of the proximity calculation processing by the proximity calculation section 224 according to the embodiment. The proximity calculation section 224 determines the level of proximity based on whether or not an obstacle of interest to be determined exists within the working region 511, and when it exists within the working region 511, based on an arrival time of the bucket 113 to the obstacle of interest, and/or the like.

In the embodiment, for example, the proximity calculation section 224 uses Tttc as an arrival time of the multijoint front working device 110 to the obstacle of interest for determination. It is noted that arrival time Tttc is calculated form the following equation (1).

$$Tttc = \cos^{-1}(Xm/\sqrt{(Xm^2 + Ym^2)})/\omega bkt \quad (1)$$

where $Xm$, $Ym$ are x, y coordinates of the obstacle of interest in the vehicle-body coordinate system, and $\omega bkt$ is an operation state, i.e., a swing angular speed of the multijoint front working device 110.

The proximity calculation processing is described below by using as an example the case where the proximity calculation section 224 sets level 1, level 2, level 3 as described below. Here, level 1 is set where an obstacle is within the working region 511 and the arrival time Tttc is equal to or less than a predetermined threshold Tth. Level 2 is set where an obstacle is within the working region 511 and the arrival time Tttc is greater than a predetermined threshold. Level 3 is set where an obstacle is without the working region 511.

It is noted that level 1 is a highest urgency level, level 3 is a low urgency level and level 2 is a urgency level between level 1 and level 3.

Step S1501

Initially, the proximity calculation section 224 determines the presence/absence of an obstacle around the hydraulic excavator 100 by use of the converted obstacle information 311. Here, for example, the proximity calculation section 224 uses the number of obstacle Mobj and/or the like for determination.

If there is no obstacle, that is, if Mobj is zero, the proximity calculation section 224 terminates the proximity calculation processing. The determination is unnecessary because of free from obstacle.

Step S1502

On the other hand, if there is an obstacle/obstacles, that is, Mobj is one or greater, the proximity calculation section 224 performs the processing to determine and set proximity for each obstacle. Here, the proximity calculation section 224 assigns serial numbers to the respective obstacles, and performs the following processing starting from the first obstacle. Initially, the proximity calculation section 224 sets one at serial-number counter m. Here, m is an integer of 1 or greater.

Step S1503

Initially, the proximity calculation section 224 determines whether or not an obstacle of interest Obj(m) exists within the working region 511. The proximity calculation section 224 determines this using the positional information 314 in the converted obstacle information and the working region map 351.

If it is determined that no obstacle of interest Obj(m) exists within the working region 511, the proximity calculation section 224 proceeds the process to step S1506. On the other hand, if it is determined that the obstacle/obstacles of interest Obj(m) exists within the working region 511, the proximity calculation section 224 proceeds the process to step S1504.

Step S1506

Here, the proximity calculation section 224 sets a proximity βm of the obstacle of interest Obj(m) to 3, and then proceeds the process to step S1509. For example, the proximity calculation section 224 stores a number 3 in association with the obstacle of interest Obj(m) in a predetermined region in the storage medium 155.

Step S1504

Here, the proximity calculation section 224 calculates an arrival time Tttc(m) of the obstacle of interest Obj(m) through the above-described approach.

Step S1505

The proximity calculation section 224 compares the arrival time Tttc(m) with a pre-retaining threshold Tth. Here, the proximity calculation section 224 determines magnitude including signs. Specifically, if Tttc(m)/Tth is 1 or less, the proximity calculation section 224 proceeds the process to step S1506, but if it is greater than 1, the proximity calculation section 224 proceeds the process to step S1508.

Step S1506

Here, the proximity calculation section 224 sets 1 as a proximity βm of the obstacle of interest Obj(m). Similarly to step S1508, the proximity calculation section 224 stores the proximity on the storage medium 155 and/or the like.

Step S1507

Here, the proximity calculation section 224 sets 2 as a proximity βm of the obstacle of interest Obj(m). Similarly to step S1508, the proximity calculation section 224 stores the proximity on the storage medium 155 and/or the like.

Steps S1509, S1510

The proximity calculation section 224 determines whether or not the proximity has been set for all the obstacles held in the converted obstacle information 311 (m=Mobj?). If not finished, the proximity calculation section 224 increments the counter m by one, and returns the process to step S1503 to repeat the processing. On the other hand, the setting is finished being performed on all the obstacles, the proximity calculation section 224 terminates the processing.

Operation Instruction Section

The operation instruction section 241 makes a decision about warning operation in accordance with the proximity β calculated by the proximity calculation section 224, and outputs a control instruction for implementing the warning operation to each component of the hydraulic excavator 100. The warning operation includes, for example, alarm output to the operator through the monitor 153 and/or the buzzer 154, the operation control on the hydraulic excavator 100, and the like.

The operation instruction processing by the operation instruction section 241 is described below in detail. In the embodiment, the operation instruction section 241 makes a decision about operation of warning performed in accordance with the level of proximity of each obstacle which is determined by the proximity calculation section 224. Then, the operation instruction section 241 outputs a control instruction corresponding to the decided operation.

In the embodiment, the operation instruction section 241 refers to the operation DB 330 for each obstacle Obj(m) for which the proximity βm is set, and decides the operation. Then, the control instruction is output to each component of the hydraulic excavator 100 to perform the decided operation.

Figure 19:
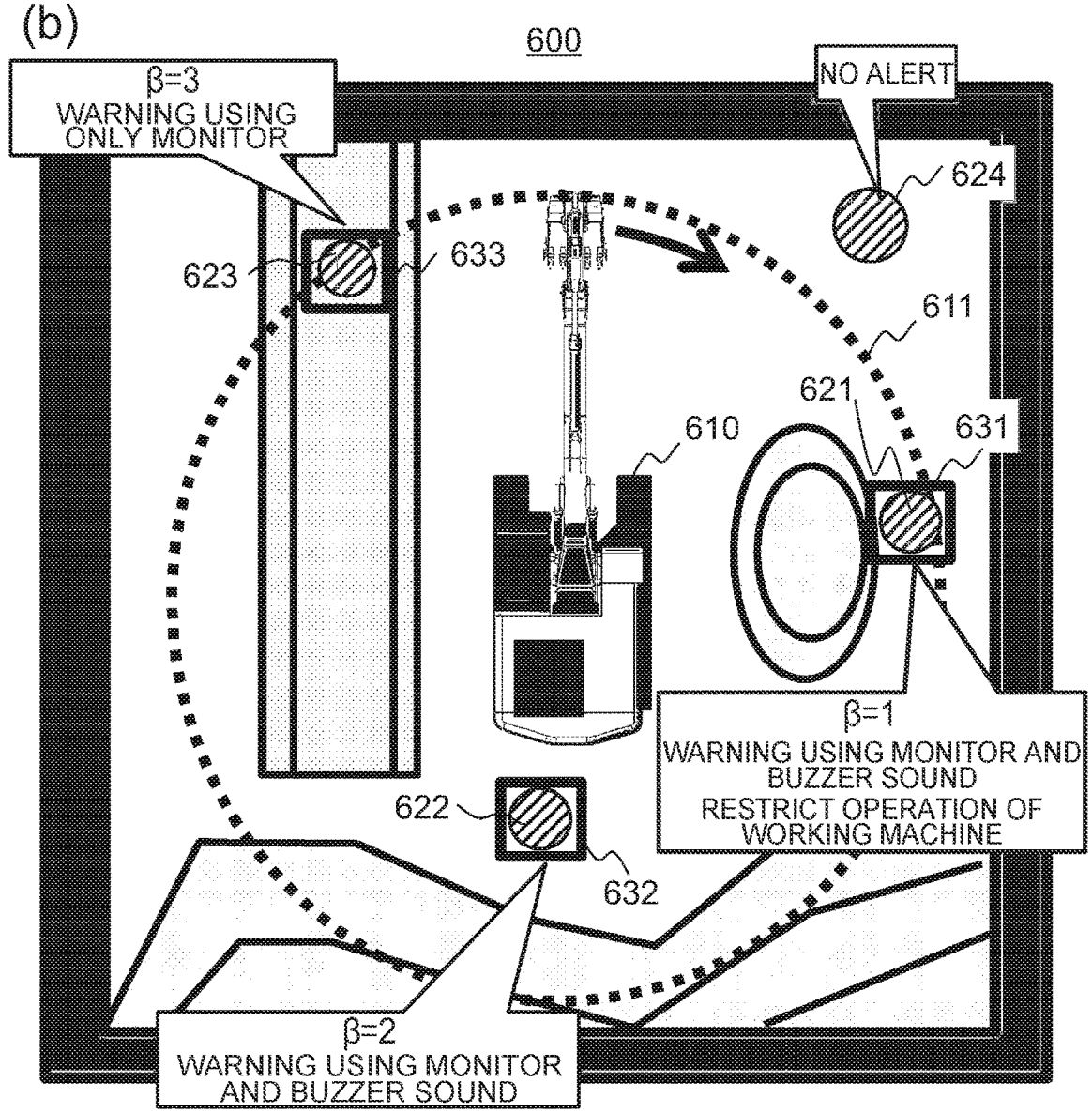
FIG. 19A is an explanatory diagram for illustrating an example of an operation database according to an embodiment of the present invention.
FIG. 19B is an explanatory diagram for illustrating an example display screen displayed on a monitor according to an embodiment of the present invention.

An example of the operation DB 330 is illustrated in FIG. 19A. As illustrated in the figure, the operation DB 330 holds information on specifying operation (operation information) 332 for each level of proximity β331.

Here, for example, where the proximity β is 3, the operation instruction section 241 outputs an instruction to display an icon indicating an existence position of the obstacle to the monitor 153. Where the proximity β is 2, in addition to the operation when the proximity β is 3, the operation instruction section 241 outputs an instruction to perform operation of issuing a warning of the approach of the obstacle to the monitor 153 or the buzzer 154. The operation of issuing a warning of the approach of an obstacle includes, for example, flashing of the monitor, output of buzzer sound, and the like. Further, where the proximity β is 1, in addition to the operation when the proximity β is 2, the operation instruction section 241 outputs an instruction to restrict the operation of the hydraulic excavator 100 in the direction toward the obstacle to the controller 162. The operation restrictions include, for example, swing inhibition and the like.

It is noted that the warning operation is not limited to the foregoing, and various operations can be conceived.

Figure 20:
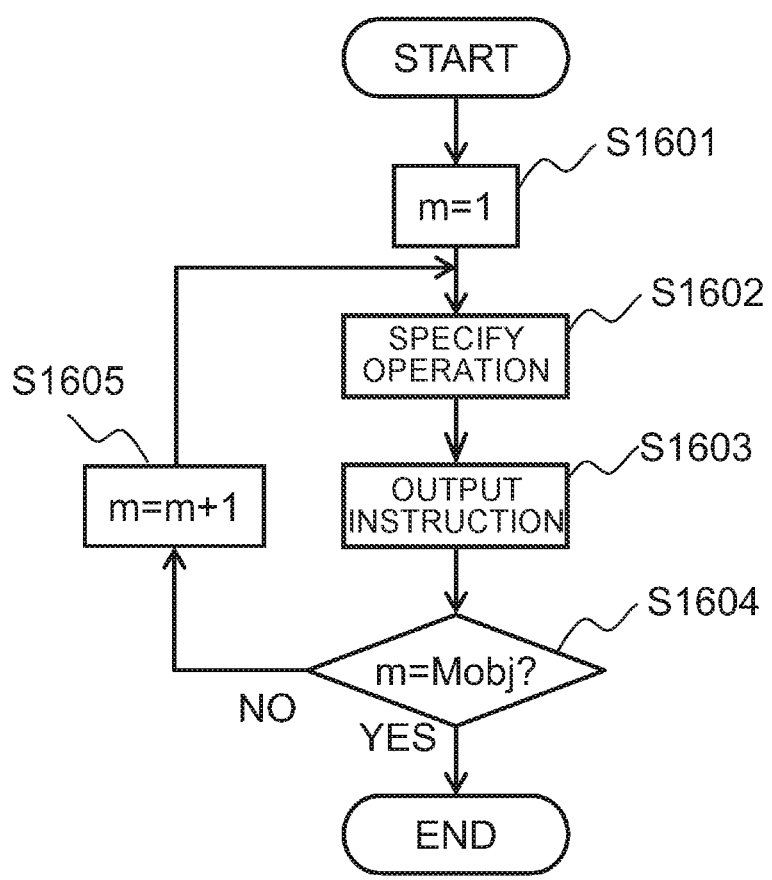
FIG. 20 is a flowchart of instruction output processing according to an embodiment of the present invention.

The instruction output processing by the operation instruction section 241 is described below in detail. FIG. 20 is a processing flow of the instruction output processing by the operation instruction section 241. Here, as in the case of the proximity calculation section 224, the operation instruction section 241 assigns serial numbers to the respective obstacles of interest, and performs the processing in order.

Step S1601

The operation instruction section 241 sets the counter m to 1.

Step S1602

The operation instruction section 241 determines the proximity βm of the obstacle of interest Obj(m), and accesses the operation DB 330 to specify corresponding operation.

Step S1603

The operation instruction section 241 outputs a control instruction for performing the specified operation to a pertinent configuration of the hydraulic excavator 100. The pertinent configuration refers to, for example, the monitor 153 and the buzzer 154 in the cab 151, the controller 162, and the like. The monitor 153 provides display according to the control signal. The buzzer 154 outputs sound according to the control signal. Also, the controller 162 receiving the control signal controls the driving of each component through the control valve 141 to prevent contact with the obstacle. Here, for example, the controller 162 controls the driving of the traveling motors 125, 126, swing motor 124, boom cylinder 121, arm cylinder 122 and the bucket cylinder 123.

Steps S1604, S1605

The operation instruction section 241 determines whether or not the processing is performed on all the obstacles Obj(m) (m=Mobj?). If there is a not-yet-processed obstacle Obj(m), the operation instruction section 241 increments m by one, and returns the process to step S1602 to repeat the processing. On the other hand, if processing is performed on all the obstacles, the operation instruction section 241 terminates the processing.

Here, example output to the monitor 153 is described. FIG. 19B is a diagram illustrating a display screen 600 which is example output to the monitor 153.

The display screen 600 displayed on the monitor 153 shows, for example, the hydraulic excavator 100, the terrain information, the working-device reach circle, and the position of each obstacle. The display screen 600 is generated by converting the coordinates of each element in the vehicle-body coordinate system 900 into a pixel position in the displayed image.

In the figure, reference sign 610 is an icon representing the hydraulic excavator 100. The icon 610 is created to imitate the shape of the hydraulic excavator 100 when seen from the z-axis direction. Reference sign 611 corresponds to the working-device reach circle 520. Also, reference signs 621, 622, 623, 624 are detected obstacles, respectively.

For example, for the obstacle 623 the proximity β is determined to be 3. Therefore, the obstacle 623 is displayed together with an icon 633 representing the existence position of the obstacle 623.

For the obstacle 622 the proximity β is determined to be 2. Therefore, the obstacle 622 is displayed together with an icon 632 representing the existence position of the obstacle 622, and further, the icon 632 and the obstacle 622 are displayed in a flashing manner. It is noted that, as an alternative to the flashing display or in addition to the flashing display, warning sound may be output from the buzzer 154.

For the obstacle 621 the proximity β is determined to be 1. Therefore, the obstacle 621 is displayed together with an icon 631 representing the existence position of the obstacle 621, and the flashing display and/or output of buzzer sound are performed. At this time, further, the control instruction is provided to the control valve 141 through the controller 162 for operation control. It is noted that the control instruction output is an instruction to inhibit the turning of the swing motor 124 in the direction toward the obstacle 621.

It is noted that the obstacle 624 in the non-working region may not be displayed.

Further, the output to the monitor 153 and the like is not limited to the example display screen 600 illustrated above, a variety of output is conceivable.

As described above, the surrounding monitoring device 200 according to the embodiment is the surrounding monitoring device 200 of the hydraulic excavator 100 including the undercarriage 132 on which the upperstructure 131 including the multijoint front working device 110 is mounted in a swingable manner. The surrounding monitoring device 200 includes: the working region setting section 223 that sets a working region by use of the terrain data and the work states received from sensors (angle detectors 181, 182, 183 and 184) detecting work states of the multijoint front working device 110 of the hydraulic excavator 100; the proximity calculation section 224 that calculates a level of proximity for each of the obstacles around the hydraulic excavator 100, the obstacles being detected by an obstacle sensor (external recognition sensor 156) that detects obstacles around the hydraulic excavator 100, by use of the set working region and relative positions of an obstacle and the hydraulic excavator 100; and an operation instruction section 241 that outputs a control instruction in accordance with a level of proximity.

In this manner, according to the embodiment, the terrain data is taken into account to set a working region. Based on the working region a level of proximity is calculated. And, a warning operation is controlled in accordance with the level of proximity. Accordingly, the warning operation in contemplation of terrain features can be performed. Therefore, excessive warning output and excessive avoidance control can be reduced. As a result, an improvement in work efficiency is enabled while necessary and sufficient monitoring is performed on the surroundings of a working machine.

Further, to determine a working region, consideration is given to the reach range of the hydraulic excavator 100, the reliability of terrain data, the altitude of terrain, the materials of terrain, and the like. Thus, a working region can be determined with higher precision. And, because the level of proximity is calculated based on the working region decided with high precision, the work efficiency can be further increased.

Further, because the warning operation is varied in response to a level of proximity, the operator can be intuitively grasp a degree of proximity to an obstacle, leading to further improved work efficiency.

LIST OF REFERENCE SIGNS

100: Hydraulic excavator
110: Multijoint front working device
111: Boom
112: Arm
113: Bucket
121: Boom cylinder
122: Arm cylinder
123: Bucket cylinder
124: Swing motor
125: Traveling motor
126: Traveling motor
130: Vehicle body
131: Upperstructure
132: Undercarriage
141: Control valve
142: Hydraulic pump
143: Engine
151: Cab
152: Control lever
153: Monitor
154: Buzzer
155: Storage medium
156: External recognition sensor
161: Information controller
162: Controller
181: Angle detector
182: Angle detector
183: Angle detector
184: Angle detector
200: Surrounding monitoring device
211: Obstacle information acquisition section
221: Terrain information acquisition section
222: Terrain information reliability evaluation section
223: Working region setting section
224: Proximity calculation section
231: Machine state acquisition section
232: Operation state determination section
241: Operation instruction section
310: Obstacle DB
311: Converted obstacle information
312: Record number
313: Obstacle ID
314: Positional information
320: Terrain DB
321: Converted terrain information
321a: Height
321b: Material information
321c: Data-acquiring time
321d: Sensor type
330: Operation DB
331: Level of proximity $\beta$
332: Operation information
351: Working region map
511: Working region
511a: Working region candidate region
512: Non-working region
520: Working-device reach circle
531: Mount
532: Earth and sand
551: Region
552: Region
600: Display screen
610: Icon
611: Working-device reach circle display
621: Obstacle
622: Obstacle
623: Obstacle
624: Obstacle
631: Icon
632: Icon
633: Icon
710: Height
711: Mount
720: Obstacle
900: Vehicle-body coordinate system

The invention claimed is:
1. A working machine, in which an upperstructure including a front working device is mounted to be capable of swinging relative to an undercarriage, the working machine comprising a surrounding monitoring device that monitors surroundings,
    wherein the surrounding monitoring device has an information controller that:
        obtains terrain information around the working machine;
        calculates a degree of reliability of the terrain information based on a change of the terrain information with time;
        obtains work states of the front working device of the working machine;
        sets a working region based on the terrain information, the degree of reliability and the work states of the front working device of the working machine;
        calculates a proximity for each of the obstacles around the working machine by use of the working regions set and relative positions of each of obstacles and the working machine, the obstacles being detected by an obstacle sensor that detects obstacles around the working machine; and
        outputs a control instruction in accordance with the proximity.

2. The working machine according to claim 1,
wherein the information controller sets, as the working region, interiors of reachable regions when the upperstructure swings under a condition where the front working device maintains the work state, and
in a case where the obstacle exists in one of the working regions, the information controller calculates the proximity in accordance with the relative positions.

3. The working machine according to claim 2,
wherein the proximity has a plurality of levels,
the information controllers sets, to a highest level, the proximity of the obstacle located in the working region and in a predefined first range, and
the first range is a region which the front working device in the working region reaches within a predetermined time period.

4. The working machine according to claim 1, further comprising at least one of a monitor and a buzzer as an output device,
wherein the control instruction is an instruction to produce warning output from the output device.

5. The working machine according to claim 1, further comprising a controller that controls swinging of the upperstructure,
wherein the control instruction is a swing inhibiting instruction to the controller.

6. A working machine,
in which an upperstructure including a front working device is mounted to be capable of swinging relative to an undercarriage, the working machine comprising a surrounding monitoring device that monitors surroundings,
    wherein the surrounding monitoring device has an information controller that:
        sets a working region by use of terrain data and work states received from sensors detecting the work states of the front working device of the working machine;
        calculates a proximity for each of the obstacles around the working machine by use of the working regions set and relative positions of each of obstacles and the working machine, the obstacles being detected by an obstacle sensor that detects obstacles around the working machine; and
        outputs a control instruction in accordance with the proximity,
    wherein the information controller sets, as the working region, interiors of reachable regions when the upperstructure swings under a condition where the front working device maintains the work state,
    in a case where the obstacle exists in one of the working regions, the information controller calculates the proximity in accordance with the relative positions,
    wherein the work state includes a position in a horizontal plane of a distal end of the front working device,
    the information controller further includes a reliability evaluation section to evaluate a degree of reliability of the terrain data, and
    the information controller sets, as a working region candidate, a region with the degree of reliability of less than a predetermined degree located inside a circumference in the horizontal plane, the circumference being centered at a swing center of the working machine and having, as a radius, a line segment from the swing center to a position of the distal end.

7. The working machine according to claim 6,
wherein the terrain data includes a height of a terrain around the working machine,
the work state includes a height of a lowermost end of the front working device, and
the information controller sets, as non-working regions, high-altitude regions of regions with the degree of reliability of a predetermined degree or greater located inside the circumference, the high-altitude regions being regions each in which the height of the terrain is higher than the height of the lowermost end.

8. The working machine according to claim 7,
wherein the terrain data further include material data which is data used to specify a hardness of the terrain for each terrain, and
the information controller does not set, as the non-working regions, a region of which a hardness is determined from the material data to be less than a predetermined hardness, even if the region is one of the high-altitude regions.

9. The working machine according to claim 8,
wherein the information controller sets, as a non-working region, a region of the high-altitude regions, the region is located farther away from the working machine in a radius direction than a region set as one of the non-working regions.

10. The working machine according to claim 6,
wherein the proximity has a plurality of levels,
the information controllers sets, to a highest level, the proximity of the obstacle located in the working region and in a predefined first range, and
the first range is a region which the front working device in the working region reaches within a predetermined time period.

11. The working machine according to claim 6, further comprising at least one of a monitor and a buzzer as an output device,
wherein the control instruction is an instruction to produce warning output from the output device.

12. The working machine according to claim 6, further comprising a controller that controls swinging the upperstructure, wherein the control instruction is a swing inhibiting instruction to the controller.

\* \* \* \* \*